United States Patent
Katsuta et al.

(10) Patent No.: US 10,884,554 B2
(45) Date of Patent: Jan. 5, 2021

(54) DISPLAY DEVICE WITH TOUCH DETECTION FUNCTION AND ELECTRONIC APPARATUS

(71) Applicant: Japan Display Inc., Tokyo (JP)

(72) Inventors: Tadayoshi Katsuta, Tokyo (JP); Hiroshi Mizuhashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 705 days.

(21) Appl. No.: 14/163,094

(22) Filed: Jan. 24, 2014

(65) Prior Publication Data

US 2014/0210779 A1  Jul. 31, 2014

(30) Foreign Application Priority Data

Jan. 25, 2013 (JP) ................................ 2013-012647
Jan. 22, 2014 (JP) ................................ 2014-009863

(51) Int. Cl.
| | | |
|---|---|---|
| *G06F 3/044* | (2006.01) | |
| *G06F 3/041* | (2006.01) | |
| *G02F 1/1333* | (2006.01) | |

(52) U.S. Cl.
CPC ............ *G06F 3/044* (2013.01); *G06F 3/0412* (2013.01); *G06F 3/0416* (2013.01); *G02F 1/13338* (2013.01)

(58) Field of Classification Search
CPC .................. G06F 3/0412; G06F 3/044; G06F 2203/04111; G06F 2203/04112
USPC ................................................. 345/173, 174
See application file for complete search history.

(56) References Cited

U.S. PATENT DOCUMENTS

| | | | |
|---|---|---|---|
| 8,791,916 B2 | 7/2014 | Mizuhashi et al. | |
| 9,030,420 B2* | 5/2015 | Noguchi et al. | ............... 345/173 |
| 2003/0107564 A1* | 6/2003 | Miyazawa | ........... G09G 3/3648 345/204 |
| 2010/0013791 A1* | 1/2010 | Haga | ..................... G06F 3/0412 345/174 |

(Continued)

FOREIGN PATENT DOCUMENTS

| | | |
|---|---|---|
| CN | 101937298 A | 1/2011 |
| CN | 102799306 A | 11/2012 |

(Continued)

OTHER PUBLICATIONS

Notice of Preliminary Rejection issued in connection with Korean Patent Application No. 10-2014-0008563, dated May 15, 2015. (10 pages).

(Continued)

*Primary Examiner* — Ifedayo B Iluyomade
(74) *Attorney, Agent, or Firm* — K&L Gates LLP

(57) ABSTRACT

According to an aspect, a display device with a touch detection function includes: a display area where a plurality of pixel electrodes are arranged; drive electrodes provided so as to face the pixel electrodes; a control device for performing image display control; a touch detection electrode facing the drive electrodes; a touch detection unit for detecting a position of a proximity object; a wiring arranged in a frame area positioned outside the display area; and a plurality of selection switches for selecting the drive electrodes to be coupled to the wiring based on a selection signal of the control device. The control device supplies the display drive voltage and a touch drive signal to the same wiring at different times.

16 Claims, 31 Drawing Sheets

(56) References Cited

U.S. PATENT DOCUMENTS

| | | | |
|---|---|---|---|
| 2010/0214262 A1 | 8/2010 | Ishizaki et al. | |
| 2010/0328259 A1* | 12/2010 | Ishizaki | G06F 3/044 345/174 |
| 2011/0210939 A1* | 9/2011 | Reynolds | G06F 3/0418 345/174 |
| 2011/0267293 A1* | 11/2011 | Noguchi | G06F 3/0416 345/173 |
| 2012/0262387 A1* | 10/2012 | Mizuhashi | G06F 3/0445 345/173 |
| 2013/0004709 A1* | 1/2013 | Mizuno | G06F 3/044 428/138 |
| 2014/0192012 A1* | 7/2014 | Kurasawa | G06F 3/044 345/174 |
| 2014/0192019 A1* | 7/2014 | Fukushima | 345/174 |
| 2014/0210779 A1* | 7/2014 | Katsuta et al. | 345/174 |
| 2015/0329259 A1* | 11/2015 | Varbanov | B65D 75/008 383/42 |

FOREIGN PATENT DOCUMENTS

| | | | |
|---|---|---|---|
| JP | 2010-049206 | 3/2010 | |
| JP | 2011089429 | * 4/2011 | G02F 1/133 |
| JP | 2012-221485 | 11/2012 | |
| JP | 2012-230657 | 11/2012 | |
| TW | 201106074 | 2/2011 | |
| TW | 201120698 | 6/2011 | |

OTHER PUBLICATIONS

Office Action issued in TW application 103102596, dated Dec. 21, 2015 (19 pages).

Chinese Office Action (with English translation) dated Dec. 14, 2016 in corresponding Chinese application No. 2014100322293 (18 pages).

Chinese Office Action (with English translation) dated May 13, 2016 in corresponding Chinese Application No. 201410032229.3.

\* cited by examiner

DISPLAY DEVICE WITH TOUCH DETECTION FUNCTION AND ELECTRONIC APPARATUS

CROSS REFERENCES TO RELATED APPLICATIONS

The present application claims priority to Japanese Priority Patent Application JP 2013-012647 filed in the Japan Patent Office on Jan. 25, 2013, and Japanese Priority Patent Application JP 2014-009863 filed in the Japan Patent Office on Jan. 22, 2014 the entire content of which is hereby incorporated by reference.

BACKGROUND

1. Technical Field

The present disclosure relates to a display device and an electronic apparatus capable of detecting an external proximity object, and in particular, to a display device with a touch detection function and an electronic apparatus capable of detecting an external proximity object, which is externally positioned in proximity, based on a change in an electrostatic capacitance.

2. Description of the Related Art

In recent years, a touch detection device capable of detecting an external proximity object, what is called a touch panel, has been attracting attention. The touch panel is used in a display device with a touch detection function which is mounted on or integrated into a display device such as a liquid crystal display device. The display device with a touch detection function displays various button images, or the like, on the display device to allow for information input with the use of the touch panel provided as a substitute for typical mechanical buttons. The display device with a touch detection function having such a touch panel does not require input devices such as a keyboard, a mouse, and a keypad. Therefore, as well as in computers, the use thereof has been expanding also in personal informations devices such as mobile phones.

As a system used in a touch detection device, there are some systems such as an optical type, a resistance type, and a capacitance type. A capacitance type touch detection device, which is used for a portable electronic apparatus or the like, has a relatively simple configuration and is capable of achieving low power consumption. For example, Japanese Patent Application Laid-open Publication No. 2012-221485 (JP-A-2012-221485) describes a capacitance type touch panel.

In a display panel with a touch detection function, there is a possibility that an operation for touch detection influences display, for example, since a display function and a touch detection function are integrated together. On the contrary, the display device with a touch detection function described in JP-A-2012-221485 can reduce an effect on display even when touch detection is performed. The display device with a touch detection function described in JP-A-2012-221485 includes a drive unit for selectively applying a direct-current drive voltage VcomDC or an alternating current drive signal VcomAC to a drive electrode. In this display panel with a touch detection function, while display elements are driven for display, a drive signal is applied to the drive electrode and a signal corresponding to that drive signal is outputted from a touch detection electrode. Thus, two wirings for respectively supplying the DC drive voltage VcomDC and the AC drive signal VcomAC to the drive electrode need to be arranged in a frame area.

In the above-described display device with a touch detection function described in JP-A-2012-221485, consideration is not made for both of reducing the effect of the operation for touch detection on display and narrowing the frame.

For the foregoing reasons, there is a need for a display device with a touch detection function and an electronic apparatus capable of narrowing a frame while reducing an effect of touch detection on display.

SUMMARY

According to an aspect, a display device with a touch detection function includes: a display area where a plurality of pixel electrodes are arranged in a matrix shape above a substrate; multi-divided drive electrodes provided so as to face the pixel electrodes; a display functional layer having an image display function of displaying an image on the display area; a control device for performing image display control by applying a display drive voltage between the pixel electrodes and the drive electrodes based on an image signal to exert the image display function of the display functional layer; a touch detection electrode facing the drive electrodes and forming a capacitance between the touch detection electrode and the drive electrodes; a touch detection unit for detecting a position of a proximity object based on a detection signal from the touch detection electrode; a wiring arranged in a frame area positioned outside the display area; and a plurality of selection switches for selecting the drive electrodes to be coupled to the wiring based on a selection signal of the control device. The control device supplies the display drive voltage and a touch drive signal to the same wiring at different times.

According to another aspect, an electronic apparatus includes a display device with a touch detection function capable of detecting an external proximity object. The display device with a touch detection function includes: a display area where a plurality of pixel electrodes are arranged in a matrix shape above a substrate; multi-divided drive electrodes provided so as to face the pixel electrodes; a display functional layer having an image display function of displaying an image on the display area; a control device for performing image display control by applying a display drive voltage between the pixel electrodes and the drive electrodes based on an image signal to exert the image display function of the display functional layer; a touch detection electrode facing the drive electrodes and forming a capacitance between the touch detection electrode and the drive electrodes; a touch detection unit for detecting a position of a proximity object based on a detection signal from the touch detection electrode; a wiring arranged in a frame area positioned outside the display area; and a plurality of selection switches for selecting the drive electrodes to be coupled to the wiring based on a selection signal of the control device. The control device supplies the display drive voltage and a touch drive signal to the same wiring at different times.

Additional features and advantages are described herein, and will be apparent from the following Detailed Description and the figures.

DETAILED DESCRIPTION

Embodiments will be described in detail with reference to the drawings. The present disclosure is not limited by the contents described in the following embodiments. Constituent elements described below include those readily conceived of by those skilled in the art and substantially identical components. Furthermore, the constituent elements described below can be appropriately combined with one another. A description will be given in the following order.
1. Embodiments (Display device with touch detection function)
   1-1. First embodiment
   1-2. Second embodiment
   1-3. Third embodiment
   1-4. Modification
2. Application examples (Electronic apparatuses)
   Examples in which the display devices with a touch detection function according to any one the embodiments above is applied to the electronic apparatuses.
3. Aspects of present disclosure

1-1. First Embodiment

1-1A. Configuration Example

Schematic Configuration Example

Figure 1:
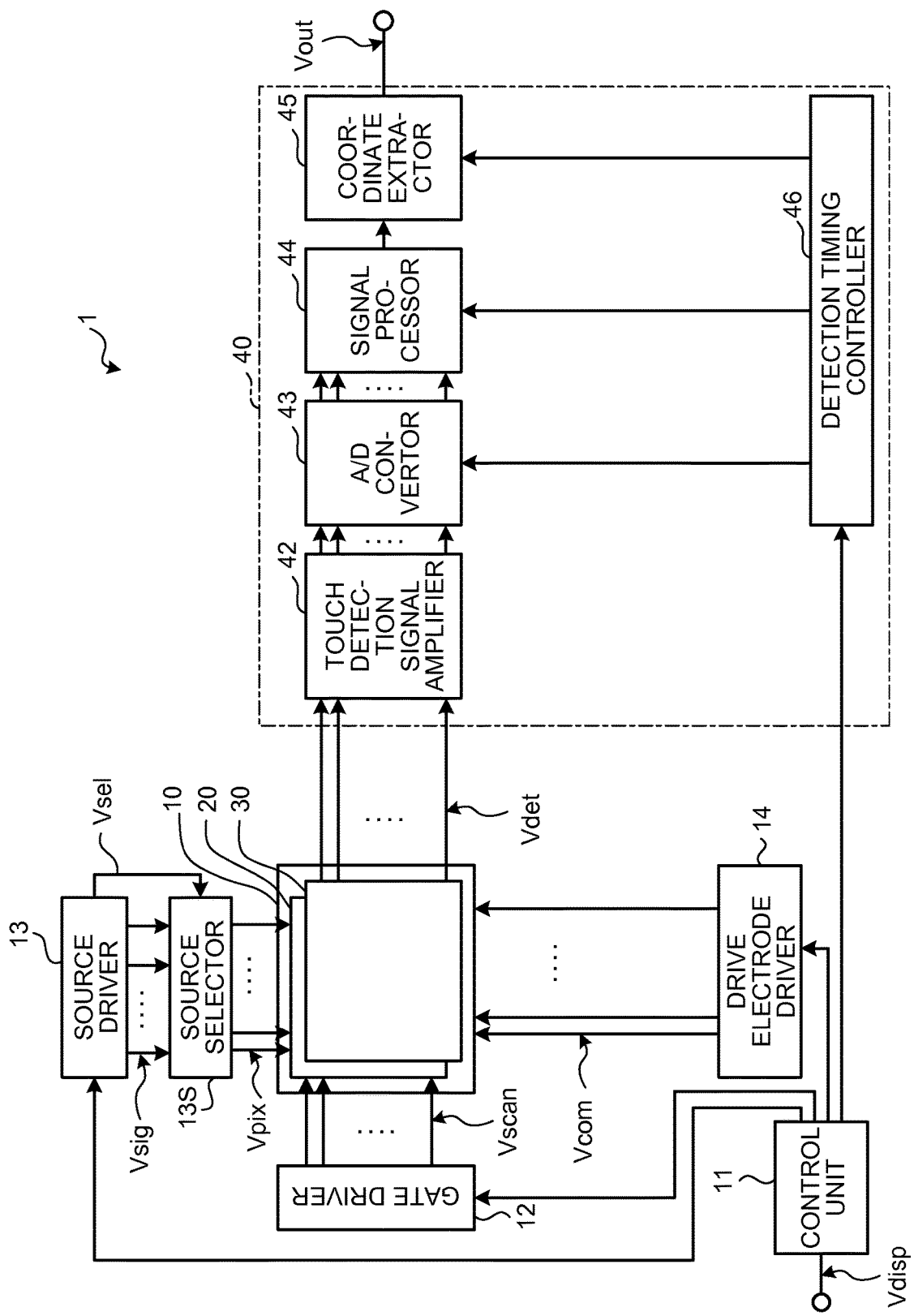
FIG. 1 is a block diagram representing a configuration example of a display device with a touch detection function according to a first embodiment.

FIG. 1 is a block diagram representing a configuration example of a display device with a touch detection function according to the first embodiment. The display device with a touch detection function 1 includes a display unit with a touch detection function 10, a control unit 11, a gate driver 12, a source driver 13, a source selector 13S, a drive electrode driver 14, and a touch detection unit 40. The display device with a touch detection function 1 is a display device in which the display unit with a touch detection function 10 incorporates a touch detection function. The display unit with a touch detection function 10 is a device obtained by integrating a liquid crystal display unit 20, in which a liquid crystal display elements are used as the display elements, and a capacitance type touch detection device 30.

The liquid crystal display unit 20 is a device which performs display by sequentially scanning the horizontal lines one by one in accordance with a scanning signal Vscan supplied from the gate driver 12 as described later. The control unit 11 is a circuit which supplies control signals to the gate driver 12, the source driver 13, the drive electrode driver 14, and the touch detection unit 40, respectively, based on a video signal Vdisp supplied from outside so as to control them in such a way that they are operated in a mutually-synchronized manner. A control device in the present disclosure includes the control unit 11, the gate driver 12, the source driver 13, and the drive electrode driver 14.

The gate driver 12 has a function of sequentially selecting one horizontal line to be driven for display in the display unit with a touch detection function 10 based on the control signal supplied from the control unit 11.

The source driver 13 is a circuit for supplying a pixel signal Vpix to each pixel Pix (sub-pixels SPix), which will be described later, in the display unit with a touch detection function 10 based on the control signal supplied from the control unit 11. As will be described later, the source driver 13 generates, from the control signal for one horizontal line, an image signal Vsig into which the pixel signals Vpix for the plurality of sub-pixels SPix in the liquid crystal display unit 20 are time-divisionally multiplexed. The source driver 13 supplies the generated image signal Vsig to the source selector 13S. The source driver 13 also generates switch control signals Vsel required for demultiplexing the pixel signals Vpix multiplexed into the image signal Vsig. The source driver 13 supplies the switch control signals Vsel to the source selector 13S together with the image signal Vsig. The source selector 13S can reduce the number of wirings between the source driver 13 and the source selector 13S.

The drive electrode driver 14 is a circuit for supplying a drive signal for touch detection (a touch drive signal, hereinafter also referred to as a drive signal) VcomAC and a display drive voltage VcomDC, which is a voltage for display, to a drive electrode COML to be described later in the display unit with a touch detection function 10 based on the control signal supplied from the control unit 11.

The touch detection unit 40 is a circuit for detecting the presence or absence of a touch with respect to the touch detection device 30 (the above-described contact state) based on the control signal supplied from the control unit 11 and a touch detection signal Vdet supplied from the touch detection device 30 in the display unit with a touch detection function 10 and for obtaining, if a touch is present, the coordinate in the touch-detected area, or the like. The touch detection unit 40 includes a touch detection signal amplifier 42, an A/D convertor 43, a signal processor 44, a coordinate extractor 45, and a detection timing controller 46.

The touch detection signal amplifier 42 amplifies the touch detection signal Vdet supplied from the touch detection device 30. The touch detection signal amplifier 42 may include a low-pass analog filter for removing a high-frequency component (noise component) contained in the touch detection signal Vdet so as to extract and output a touch component.

Basic Principle of Capacitance Type Touch Detection

Figure 2:
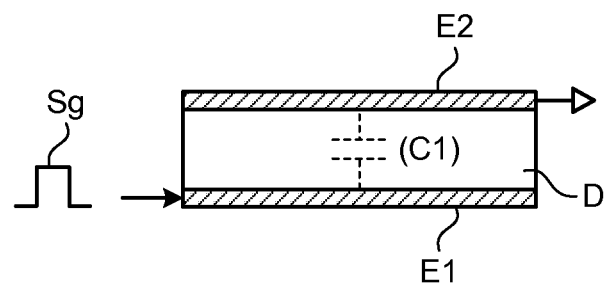
FIG. 2 is an explanatory diagram for explaining the basic principle of a capacitance type touch detection system, representing a state where a finger is neither in contact with nor in proximity to the device.
Figure 3:
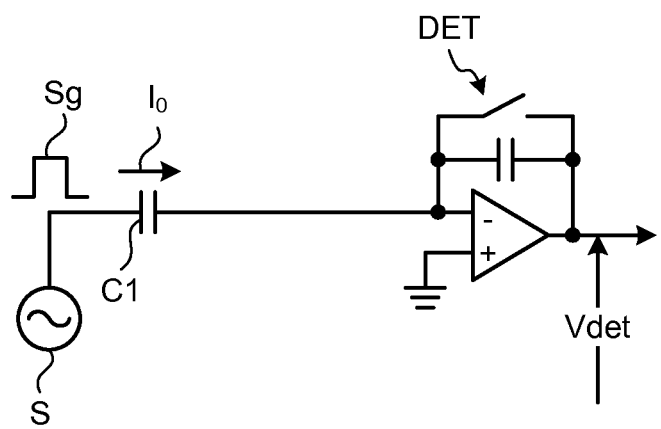
FIG. 3 is an explanatory diagram illustrating an example of an equivalent circuit of the state illustrated in FIG. 2 where a finger is neither in contact with nor in proximity to the device.
Figure 4:
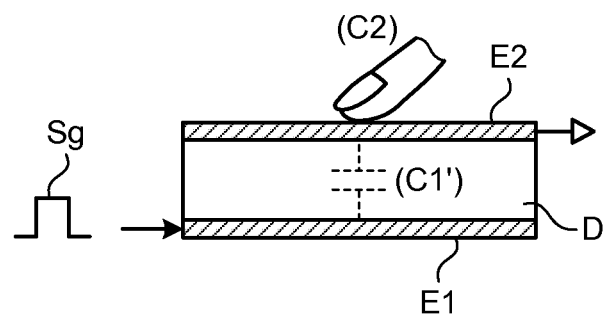
FIG. 4 is an explanatory diagram for explaining the basic principle of the capacitance type touch detection system, representing a state where a finger is in contact with or in proximity to the device.
Figure 5:
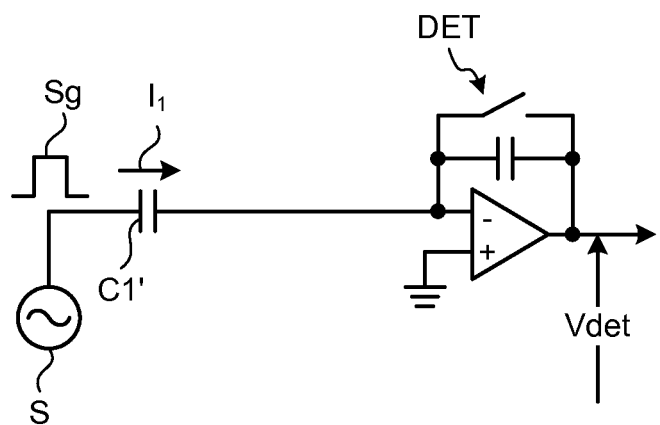
FIG. 5 is an explanatory diagram illustrating an example of an equivalent circuit of the state illustrated in FIG. 4 where a finger is in contact with or in proximity to the device.
Figure 6:
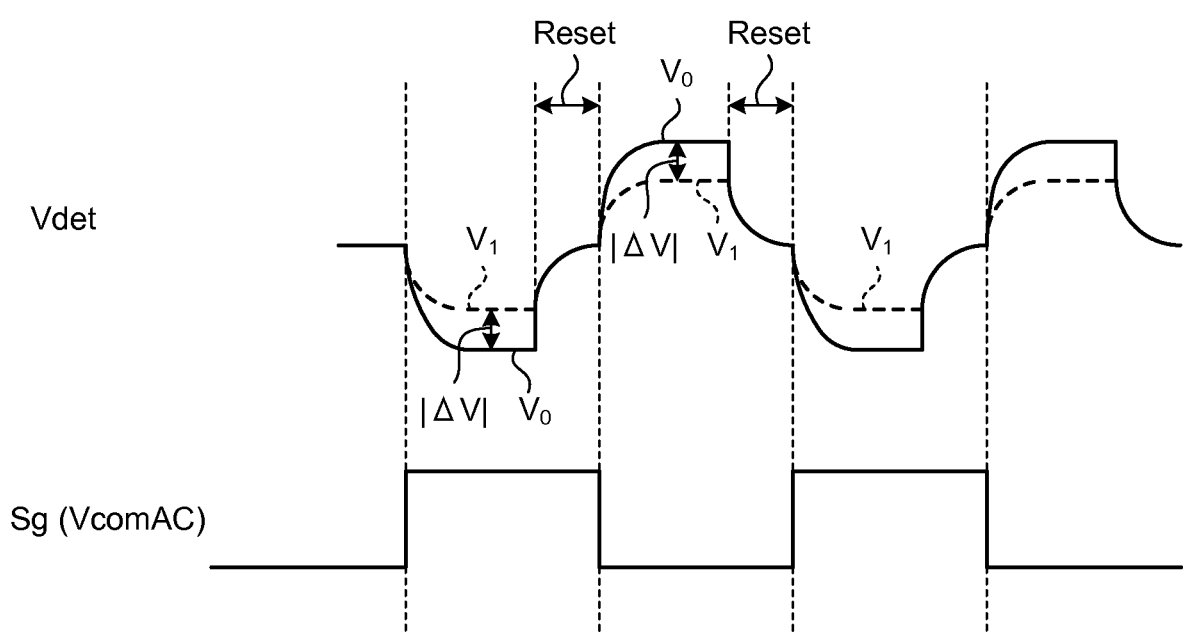
FIG. 6 is a chart representing an example of waveforms of a drive signal and a touch detection signal.

The touch detection device 30 operates based on the basic principle of the capacitance type touch detection, and outputs the touch detection signal Vdet. The basic principle of touch detection in the display device with a touch detection function 1 according to the present embodiment will be described with reference to FIGS. 1 to 6. FIG. 2 is an explanatory diagram for explaining the basic principle of the capacitance type touch detection system, representing a state where a finger is neither in contact with nor in proximity to the device. FIG. 3 is an explanatory diagram illustrating an example of an equivalent circuit of the state illustrated in FIG. 2 where a finger is neither in contact with nor in proximity to the device. FIG. 4 is an explanatory diagram for explaining the basic principle of the capacitance type touch detection system, representing a state where a finger is in contact with or in proximity to the device. FIG. 5 is an explanatory diagram illustrating an example of an equivalent circuit of the state illustrated in FIG. 4 where a finger is in contact with or in proximity to the device. FIG. 6 is a chart representing an example of waveforms of a drive signal and a touch detection signal.

For example, a capacitative element C1 includes a pair of electrodes, a drive electrode E1 and a touch detection electrode E2, disposed so as to face each other with a dielectric D interposed therebetween as illustrated in FIG. 2. As illustrated in FIG. 3, one end of the capacitative element C1 is coupled to an AC signal source (drive signal source) S. The other end thereof is coupled to a voltage detector (touch detection unit) DET. The voltage detector DET is an integration circuit contained in the touch detection signal amplifier 42 illustrated in FIG. 1, for example.

If an AC rectangular wave Sg having a predetermined frequency (about several kHz to several hundred kHz, for example) is applied to the drive electrode E1 (one end of the capacitative element C1) from the AC signal source S, an output waveform (touch detection signal Vdet) is emerged through the voltage detector DET coupled to the touch detection electrode E2 (the other end of the capacitative element C1) side. The AC rectangular wave Sg corresponds to a drive signal VcomAC to be described later.

In the state (non-contact state) where a finger is not in contact with (or in proximity to) the device, a current $I_0$ corresponding to a capacitance value of the capacitative element C1 flows along with charge and discharge with respect to the capacitative element C1 as illustrated in FIGS. 2 and 3. As illustrated in FIG. 6, the voltage detector DET converts a fluctuation in the current $I_0$ according to the AC rectangular wave Sg into a voltage fluctuation (solid-line waveform $V_0$).

In the state (contact state) where a finger is in contact with (or in proximity to) the device, on the other hand, capacitance C2 generated by a finger is in contact with or in proximity to the touch detection electrode E2 as illustrated in FIG. 4. As a result, fringe capacitance between the drive electrode E1 and the touch detection electrode E2 is blocked, thereby causing the capacitative element C1 to be functioned as a capacitative element C1' having a capacitance value smaller than that of the capacitative element C1. According to the equivalent circuit illustrated in FIG. 5, a current $I_1$ flows through the capacitative element Cr. As illustrated in FIG. 6, the voltage detector DET converts a fluctuation in the current $I_1$ according to the AC rectangular wave Sg into a voltage fluctuation (dotted-line waveform $V_1$). In this case, the waveform $V_1$ has an amplitude smaller than that of the above-described waveform $V_0$. Thus, an absolute value $|\Delta V|$ of a voltage difference between the waveform $V_0$ and the waveform $V_1$, varies in accordance with an effect caused by an external proximity object such as a finger. In order to detect the absolute value $|\Delta V|$ of the voltage difference between the waveform $V_0$ and the waveform $V_1$ with high accuracy, it is more preferable that the voltage detector DET be operated with a period Reset in which charge and discharge of a capacitor is reset in accordance with the frequency of the AC rectangular wave Sg by means of switching in the circuit.

The touch detection device 30 illustrated in FIG. 1 performs touch detection by sequentially scanning detection blocks one by one in accordance with a drive signal Vcom (drive signal VcomAC to be described later) supplied from the drive electrode driver 14.

The touch detection device 30 is configured to output the touch detection signals Vdet for respective detection blocks from a plurality of touch detection electrodes TDL to be described later through the voltage detector DET illustrated in FIG. 3 or FIG. 5, and then supply the touch detection signals Vdet to the A/D convertor 43 in the touch detection unit 40.

The A/D convertor 43 is a circuit for sampling analog signals outputted from the touch detection signal amplifier 42 at timings synchronized with the drive signal VcomAC and converting them into digital signals.

The signal processor 44 includes a digital filter for reducing a frequency component (noise component) contained in the output signal of the A/D convertor 43, excluding the sampling frequency for the drive signal VcomAC. The signal processor 44 is a logic circuit for detecting the presence or absence of a touch with respect to the touch detection device 30 based on the output signal from the A/D convertor 43. The signal processor 44 performs a process of taking out only a finger-derived difference in voltage. The finger-derived difference in voltage is the above-described absolute value $|\Delta V|$ of the difference between the waveform $V_0$ and the waveform $V_1$. The signal processor 44 may perform an averaging calculation on the absolute values $|\Delta V|$ in one detection block to obtain an average value for the absolute value $|\Delta V|$. As a result, the signal processor 44 can reduce an effect caused by noise. When the signal processor 44 compares the detected finger-derived difference in voltage to a predetermined threshold voltage and it is greater than or equal to the threshold voltage, it is determined as the contact state by the external proximity object. On the other hand, when the signal processor 44 compares the detected finger-derived difference in voltage to the predetermined threshold voltage and it is smaller than the threshold voltage, it is determined as the non-contact state by the external proximity object. In this manner, the touch detection unit 40 can perform touch detection.

The coordinate extractor 45 is a logic circuit for obtaining, when a touch is detected in the signal processor 44, the touch panel coordinate. The detection timing controller 46 controls the A/D convertor 43, the signal processor 44, and the coordinate extractor 45 so as to be operated in synchronization with one another. The coordinate extractor 45 outputs the touch panel coordinate as a signal output Vout.

Module

Figure 7:
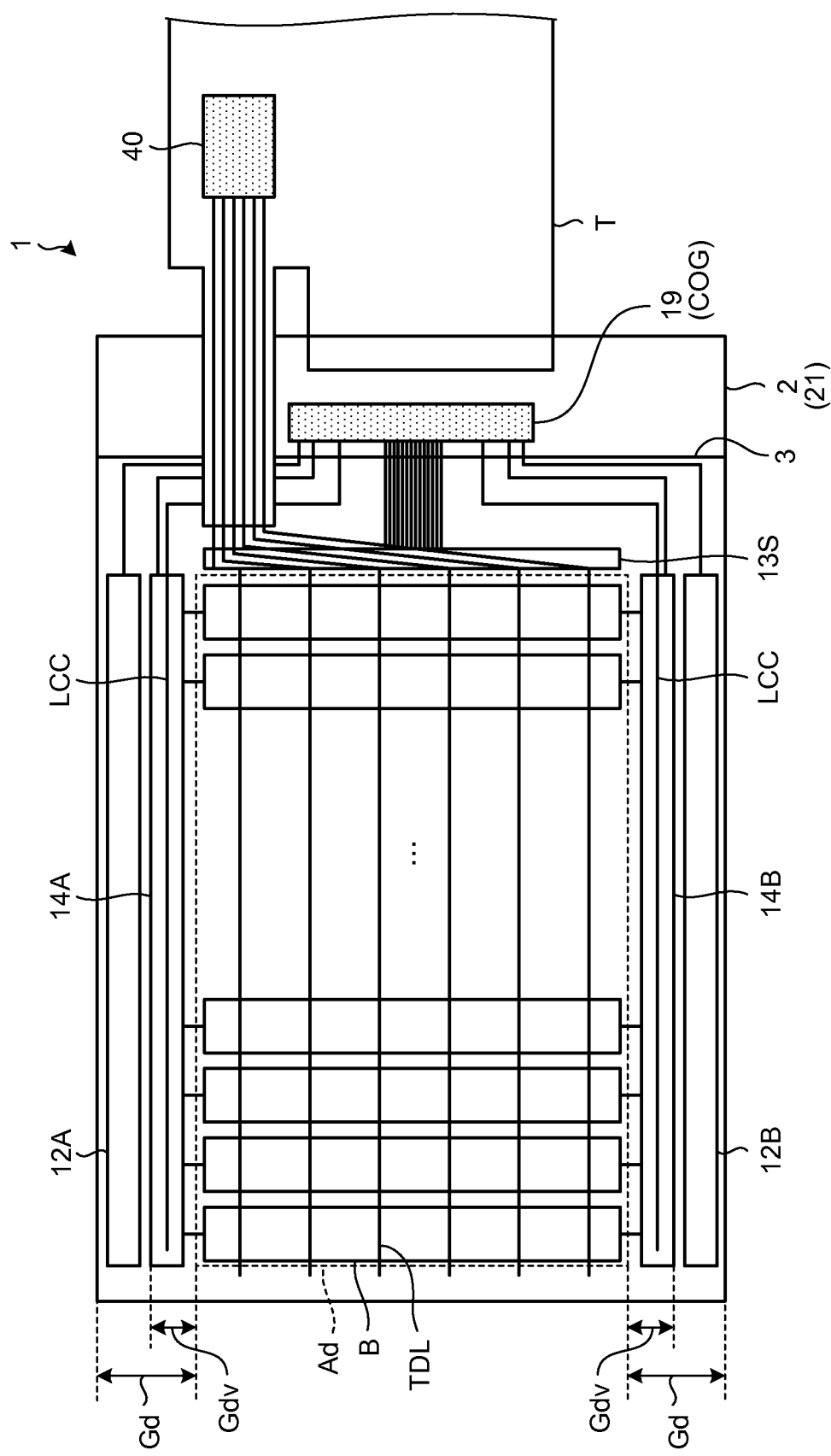
FIG. 7 is a diagram illustrating an example of a module in which the display device with a touch detection function according to the first embodiment is mounted.

FIG. 7 is a diagram illustrating an example of a module in which the display device with a touch detection function according to the first embodiment is mounted. As illustrated in FIG. 7, the display device with a touch detection function 1 includes the liquid crystal display unit 20, the drive electrode driver 14, a COG (Chip On Glass) 19, and the source selector 13S. The COG 19 includes the source driver 13 described above. The drive electrode driver 14 is formed on a TFT substrate 21 which is a glass substrate. The COG 19 is a chip mounted on the TFT substrate 21 and incorporates circuits required for display operations such as the control unit 11 and the source driver 13 illustrated in FIG. 1. Alternatively, the display device with a touch detection function 1 may incorporate circuits such as the drive electrode driver 14, the gate driver 12, and the source selector 13S in the COG (Chip On Glass) 19.

FIG. 7 schematically illustrates that the display device with a touch detection function 1 includes drive electrode blocks B for the drive electrodes COML and the touch detection electrodes TDL formed so as to sterically intersect the drive electrode blocks B (drive electrodes COML) in a direction perpendicular to the surface of the TFT substrate 21. The display device with a touch detection function 1 also includes, in the direction perpendicular to the surface of the TFT substrate 21, drive electrodes COML and later-described scanning signal lines GCL formed so as to extend in a direction parallel to the drive electrodes COML without intersecting therewith.

The drive electrodes COML are divided into a plurality of stripe-shaped electrode patterns extending in one direction. When performing a touch detection operation, the drive signal VcomAC is sequentially supplied to each electrode pattern by the drive electrode driver 14. Multiple stripe-shaped electrode patterns for the drive electrodes COML, to which the drive signal VcomAC is supplied simultaneously, correspond to one drive electrode block B illustrated in FIG. 7. The drive electrode blocks B (drive electrodes COML) are formed in a direction along one side of the TFT substrate 21. The touch detection electrodes TDL to be described later are formed in a direction along another side of the TFT substrate 21. Outputs of the touch detection electrode TDL are provided on the shorter side of the TFT substrate 21 and coupled to the touch detection unit 40 mounted on a flexible printed circuit board T via the flexible printed circuit board T. In this manner, the touch detection unit 40 is mounted on the flexible printed circuit board T and coupled to each of the plurality of touch detection electrodes TDL arranged side by side. The flexible printed circuit board T is not limited to a flexible printed circuit board and may be anything as long as it is a terminal. In this case, the touch detection unit 40 is provided outside the module.

The control unit 11, the source driver 13, and a later-described drive signal generator of a drive signal driver are implemented as the COG 19 on a pixel substrate 2. The source selector 13S is formed using TFT elements in the vicinity of a display area Ad above the TFT substrate 21. In the display area Ad, a large number of pixels Pix to be described later are arranged in a matrix shape (a shape of rows and columns). Frames Gd are areas where the pixels Pix are not disposed when the surface of the TFT substrate 21 is viewed from the direction perpendicular thereto. The gate driver 12 and drive electrode scanning units 14A and 14B of the drive electrode driver 14 are disposed in the frames Gd.

The gate driver 12 includes gate drivers 12A and 12B and is formed above the TFT substrate 21 using TFT elements. The gate drivers 12A and 12B are configured so as to drive the display area Ad, at which the pixels Pix are arranged in a matrix shape, from the both sides thereof with the display area Ad interposed therebetween.

The drive electrode scanning units 14A and 14B are formed above the TFT substrate 21 using TFT elements. The drive electrode scanning units 14A and 14B receive the supply of the display drive voltage VcomDC through conductive wirings LCC and also receive the supply of the drive signal VcomAC through the wirings LCC from the drive signal generator. The drive electrode scanning units 14A and 14B are configured so as to drive each of the plurality of drive electrode blocks B arranged side by side from the both sides thereof. The wirings LCC are arranged in the frame areas Gd positioned outside the display area Ad in the direction perpendicular to the TFT substrate 21. The wirings LCC according to the first embodiment are provided above the TFT substrate 21. Alternatively, the wirings LCC may be provided in a counter substrate 3 and may be arranged in the frame areas Gd positioned outside the display area Ad in the direction perpendicular to the TFT substrate 21.

Each of the wiring LCC has a predetermined resistance component, and a parasitic capacitance for the drive electrodes COML belonging to the drive electrode blocks B to which the drive signal VcomAC is supplied through the wiring LCC. Thus, in the drive electrode blocks B disposed at positions away from the COG 19 (drive signal generator), there is a possibility of prolonging a pulse transition time for the drive signal VcomAC. In order to reduce the possibility of prolonging a pulse transition time for the drive signal VcomAC in the drive electrode block B disposed in the vicinity of an end portion of the wiring LCC, in particular, a predetermined width (100 μm or greater, for example) needs to be maintained as a width of the wiring LCC.

Therefore, the wiring LCC according to the first embodiment is configured as a common wiring which receives the supply of the drive signal VcomAC and the supply of the display drive voltage VcomDC. As a result, the wiring LCC according to the first embodiment can reduce a space corresponding to one wiring and a room therefor as compared with a case where a wiring for receiving the supply of the drive signal VcomAC and a wiring for receiving the supply of the display drive voltage VcomDC are separately provided. The wiring LCC according to the first embodiment can also reduce the number of selection switches and an area occupied by the selection switches as compared with the case where the wiring for receiving the supply of the drive signal VcomAC and the wiring for receiving the supply of the display drive voltage VcomDC are separately provided. As a result, a width Gdv occupied by the drive electrode scanning unit 14A or 14B can be reduced in the frame Gd. For example, The wiring LCC according to the first embodiment can reduce a proportion of the width Gdv occupied by the drive electrode scanning unit 14A or 14B to the frame Gd by about 10% to 20% as compared with the case where the wiring for receiving the supply of the drive signal VcomAC and the wiring for receiving the supply of the display drive voltage VcomDC are separately provided.

The display device with a touch detection function 1 illustrated in FIG. 7 outputs the above-described touch detection signal Vdet from the shorter side of the display unit with a touch detection function 10. As a result, the display device with a touch detection function 1 can facilitate an arrangement of the wirings when coupling to the touch detection unit 40 via the flexible printed circuit board T which is a terminal area.

Display Device with Touch Detection Function

Figure 8:
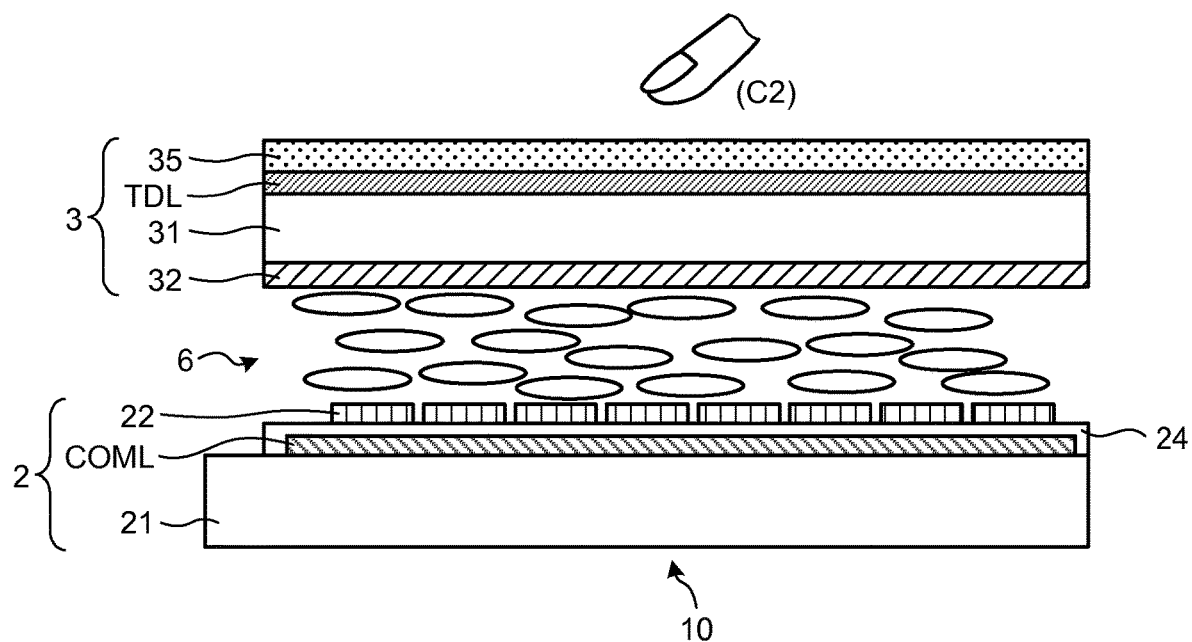
FIG. 8 is a cross-sectional view representing a schematic cross-sectional structure of a display unit with a touch detection function according to the first embodiment.
Figure 9:
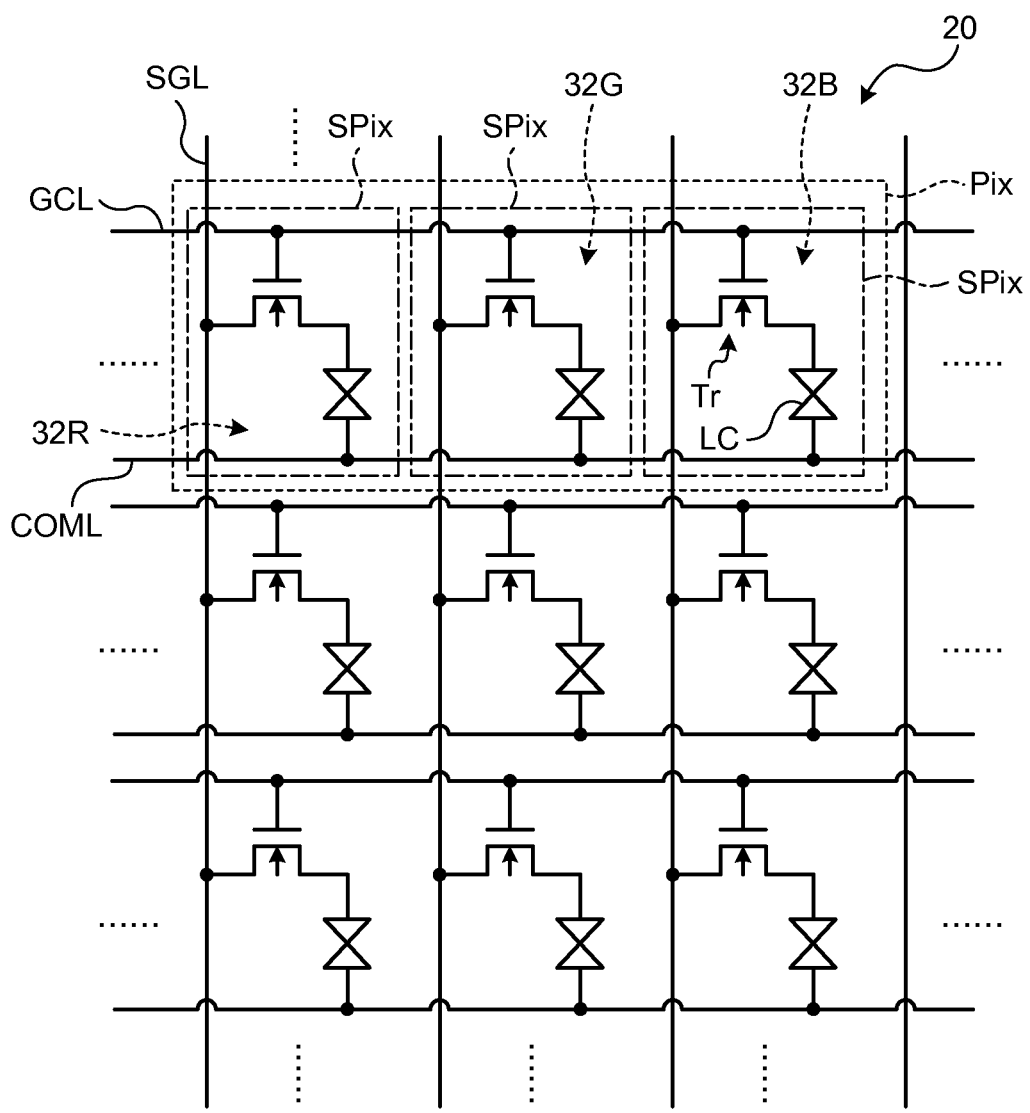
FIG. 9 is a circuit diagram representing a pixel array of the display unit with a touch detection function according to the first embodiment.

A configuration example of the display unit with a touch detection function 10 will next be described in detail. FIG. 8 is a cross-sectional view representing a schematic cross-sectional structure of the display unit with a touch detection function according to the first embodiment. FIG. 9 is a circuit diagram representing a pixel array of the display unit with a touch detection function according to the first embodiment.

As illustrated in FIG. 8, the display unit with a touch detection function 10 includes the pixel substrate 2, the counter substrate 3 disposed in an opposing manner in a direction perpendicular to the surface of the pixel substrate 2, and a liquid crystal layer 6 inserted between the pixel substrate 2 and the counter substrate 3.

The liquid crystal layer 6 modulates light passing therethrough according to a state of electric fields thereof. For example, a liquid crystal display device using liquid crystals in a transverse electric field mode such as FFS (fringe-field switching) or IPS (in-plane switching) is used. Orientation films may be provided between the liquid crystal layer 6 and the pixel substrate 2 and between the liquid crystal layer 6 and the counter substrate 3 illustrated in FIG. 8, respectively.

The counter substrate 3 includes a glass substrate 31, and a color filter 32 formed on one surface of the glass substrate 31. The touch detection electrodes TDL, which are detection electrodes for the touch detection device 30, are formed on the other surface of the glass substrate 31. A polarizer 35 is further provided on this touch detection electrode TDL.

The pixel substrate 2 includes the TFT substrate 21 as a circuit board, a plurality of pixel electrodes 22 arranged in a matrix shape above the TFT substrate 21, the plurality of drive electrodes COML formed between the TFT substrate 21 and the pixel electrodes 22, and an insulation layer 24 for providing electrical insulation between the pixel electrodes 22 and the drive electrodes COML.

Thin film transistor (TFT) elements Tr for the sub-pixels SPix illustrated in FIG. 9 and wirings such as pixel signal lines SGL for supplying the pixel signal Vpix to each of the pixel electrodes 22 and the scanning signal lines GCL for driving the respective TFT elements Tr are formed above the TFT substrate 21. In this manner, the pixel signal lines SGL extend on a plane parallel to the surface of the TFT substrate 21 and supply the pixel signal Vpix to each of the pixels for displaying an image. The liquid crystal display unit 20 illustrated in FIG. 9 has a plurality of sub-pixels SPix arranged in a matrix shape. Each sub-pixel SPix includes the TFT element Tr and a liquid crystal element LC. The TFT element Tr is formed by a thin film transistor. In this example, it is formed by an n-channel MOS (Metal Oxide Semiconductor) type TFT. A source of the TFT element Tr is coupled to the pixel signal line SGL, a gate thereof is coupled to the scanning signal line GCL, and a drain thereof is coupled to one end of the liquid crystal element LC. One end of the liquid crystal element LC is coupled to the drain of the TFT element Tr, and the other end thereof is coupled with the drive electrode COML.

In the color filter 32 illustrated in FIG. 8, color regions of the color filter, which are colored to have three colors, for example, red (R), green (G), and blue (B), are cyclically arranged so as to associate a set of color regions 32R, 32G, and 32B (see FIG. 9) having three colors of R, G, and B with the above-described sub-pixels SPix illustrated in FIG. 9 as a pixel Pix. The color filter 32 faces the liquid crystal layer 6 in the direction perpendicular to the TFT substrate 21. The color filter 32 may have a combination of other colors when it is colored to have different colors.

Each of the sub-pixels SPix illustrated in FIG. 9 is mutually coupled to other sub-pixels SPix belonging to the same row of the liquid crystal display unit 20 through the scanning signal line GCL. The scanning signal line GCL is coupled to the gate driver 12 and supplied with the scanning signal Vscan by the gate driver 12. Each of the sub-pixels SPix is mutually coupled also to other sub-pixels SPix belonging to the same column of the liquid crystal display unit 20 through the pixel signal line SGL. The pixel signal line SGL is coupled to the source driver 13 and supplied with the pixel signal Vpix by the source driver 13.

Figure 10:
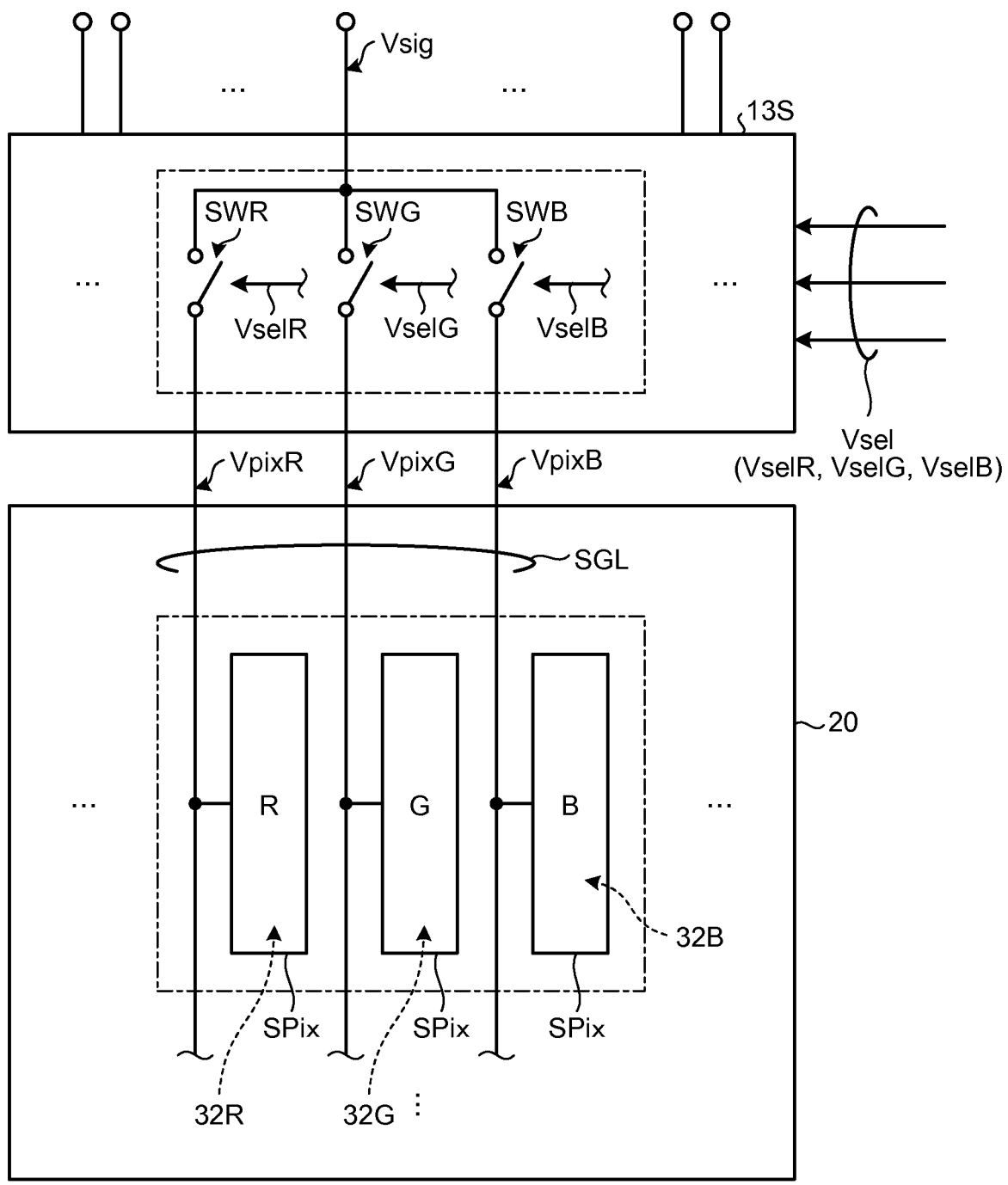
FIG. 10 is a schematic diagram for explaining a relationship between a source driver and pixel signal lines in a module in which the display device with a touch detection function according to the first embodiment is mounted.

Specifically, as illustrated in FIG. 10, in the display device with a touch detection function 1, the pixel signal lines SGL are coupled to the source driver 13 incorporated in the above-described COG 19 through the source selector 13S. The source selector 13S performs a switching operation in accordance with the switch control signal Vsel.

As illustrated in FIG. 10, the source driver 13 generates and outputs an image signal Vsig based on the control signal supplied from the control unit 11. The source driver 13 generates, from the control signal for one horizontal line, an image signal Vsig into which the pixel signals Vpix for the plurality of sub-pixels SPix (three sub-pixels SPix in this example) in the liquid crystal display unit 20 are time-divisionally multiplexed. The source driver 13 supplies the generated image signal Vsig to the source selector 13S. The source driver 13 also generates switch control signals Vsel (VselR, VselG, and VselB) required for demultiplexing the pixel signals Vpix multiplexed into the image signal Vsig. The source driver 13 supplies the generated switch control signals Vsel to the source selector 13S together with the image signal Vsig. Such multiplexing can reduce the number of wirings between the source driver 13 and the source selector 13S.

The source selector 13S demultiplexes the pixel signals Vpix time-divisionally multiplexed into the image signal Vsig based on the image signal Vsig and the switch control signals Vsel supplied from the source driver 13. The source selector 13S supplies the obtained pixel signals Vpix to the liquid crystal display unit 20 in the display unit with a touch detection function 10.

The source selector 13S includes three switches SWR, SWG, and SWB, for example. One ends of the three switches SWR, SWG, and SWB are coupled to one another and supplied with the image signal Vsig from the source driver 13. The other ends of the three switches SWR, SWG, and SWB are coupled to the respective sub-pixels SPix through the respective pixel signal lines SGL of the liquid crystal display unit 20 in the display unit with a touch detection function 10. Switching controls for the three switches SWR, SWG, and SWB are performed depending on the switch control signals Vsel (VselR, VselG, and VselB) supplied from the source driver 13, respectively. With this configuration, the source selector 13S can sequentially switch the switches SWR, SWG, and SWB to an ON state in a time division manner in accordance with the switch control signals Vsel. As a result, the source selector 13S demultiplexes the pixel signals Vpix (VpixR, VpixG, and VpixB) from the multiplexed image signal Vsig. Then, the source selector 13S supplies the pixel signals Vpix to the three sub-pixels SPix, respectively. The above-described color regions 32R, 32G, and 32B colored to have three colors of red (R), green (G), and blue (B) are associated with the sub-pixels SPix, respectively. Thus, the pixel signal VpixR is supplied to the sub-pixel SPix corresponding to the color region 32R. The pixel signal VpixG is supplied to the sub-pixel SPix corresponding to the color region 32G. The pixel signal VpixB is supplied to the sub-pixel SPix corresponding to the color region 32B.

Each of the sub-pixels SPix is mutually coupled to other sub-pixels SPix belonging to the same row of the liquid crystal display unit 20 by the drive electrode COML. The drive electrode COML is coupled to the drive electrode driver 14 and supplied with the display drive voltage VcomDC by the drive electrode driver 14. In other words, the plurality of sub-pixels SPix belonging to the same row share one drive electrode COML in this example.

The gate driver 12 illustrated in FIG. 1 applies the scanning signal Vscan to the gates of the TFT elements Tr in the sub-pixels SPix through the scanning signal line GCL illustrated in FIG. 9. As a result, one row (one horizontal line) of the sub-pixels SPix formed in a matrix shape in the liquid crystal display unit 20 is sequentially selected to be driven for display. The source driver 13 and the source selector 13S illustrated in FIG. 1 supply the pixel signal Vpix to each of the sub-pixels SPix making up one horizontal line sequentially selected by the gate driver 12 through the pixel signal line SGL illustrated in FIG. 9. Then, display for one horizontal line is performed in these sub-pixels SPix in accordance with the provided pixel signal Vpix. The drive electrode driver 14 illustrated in FIG. 1 applies the drive signal Vcom in order to drive the drive electrodes COML in each drive electrode block consisting of a predetermined number of drive electrodes COML.

As described above, in the liquid crystal display unit 20, the gate driver 12 drives the scanning signal lines GCL to be line-sequentially scanned in a time division manner so that one horizontal line is sequentially selected. In the liquid crystal display unit 20, display is performed for each horizontal line by supplying the pixel signal Vpix to the sub-pixels SPix belonging to one horizontal line by the source driver 13 and the source selector 13S. When performing this display operation, the drive electrode driver 14 applies the display drive voltage VcomDC to the drive electrode block containing the drive electrode COML corresponding to that horizontal line.

Figure 11:
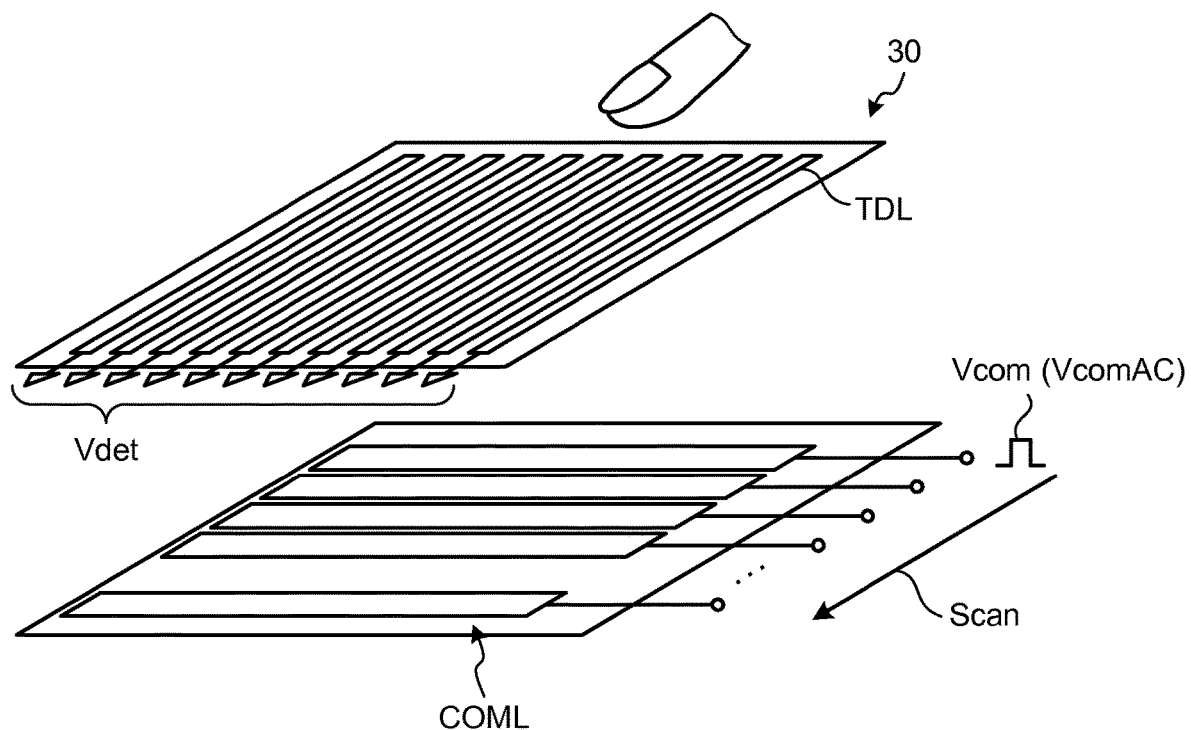
FIG. 11 is a perspective view representing a configuration example of drive electrodes and touch detection electrodes in the display device with a touch detection function according to the first embodiment.

The drive electrode COML according to the present embodiment functions as a drive electrode for the liquid crystal display unit 20 and also as a drive electrode for the touch detection device 30. FIG. 11 is a perspective view representing a configuration example of the drive electrodes and the touch detection electrodes in the display device with a touch detection function according to the first embodiment. As illustrated in FIG. 8, the drive electrodes COML illustrated in FIG. 11 face the pixel electrodes 22 in the direction perpendicular to the surface of the TFT substrate 21. The touch detection device 30 is configured by the drive electrodes COML provided in the pixel substrate 2 and the touch detection electrodes TDL provided in the counter substrate 3. The touch detection electrodes TDL are formed by stripe-shaped electrode patterns extending in a direction intersecting an extending direction of electrode patterns of the drive electrodes COML. The touch detection electrodes TDL face the drive electrodes COML in the direction perpendicular to the surface of the TFT substrate 21. The electrode patterns of the touch detection electrodes TDL are coupled to inputs of the touch detection signal amplifier 42 in the touch detection unit 40, respectively. The electrode patterns of the drive electrodes COML and the touch detection electrodes TDL intersecting with each other generates capacitance at each intersection. The touch detection electrodes TDL or the drive electrodes COML (drive electrode blocks) are not limited to a multi-divided stripe shape. For example, the touch detection electrodes TDL or the drive electrodes COML (drive electrode blocks) may have a comb-teeth shape. Alternatively, the touch detection electrodes TDL or the drive electrodes COML (drive electrode blocks) only have to be divided into a plurality of sections and a shape of a slit for dividing the drive electrodes COML may be a straight line or a curved line.

With this configuration, in the touch detection device 30, the drive electrode driver 14 drives the drive electrode blocks B illustrated in FIG. 7 to be line-sequentially scanned in a time division manner when the touch detection operation is performed. As a result, the drive electrode block B (one detection block) for the drive electrodes COML is sequentially selected in a scanning direction Scan. Then, the touch detection device 30 outputs the touch detection signal Vdet from the touch detection electrode TDL. In this manner, the touch detection device 30 performs touch detection for one detection block.

Figure 12:
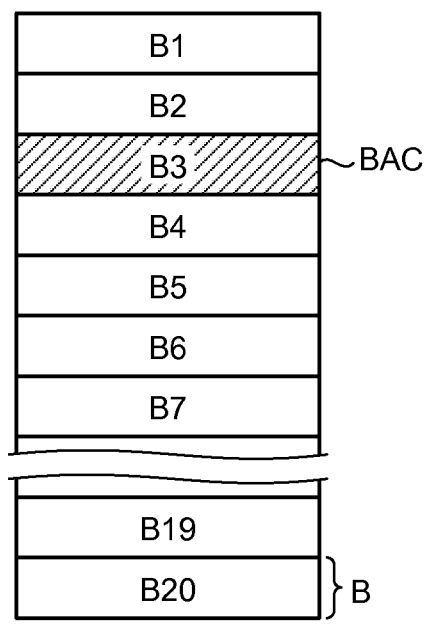
FIG. 12 is a schematic diagram representing an operation example of touch detection in the display device with a touch detection function according to the first embodiment.
Figure 13:
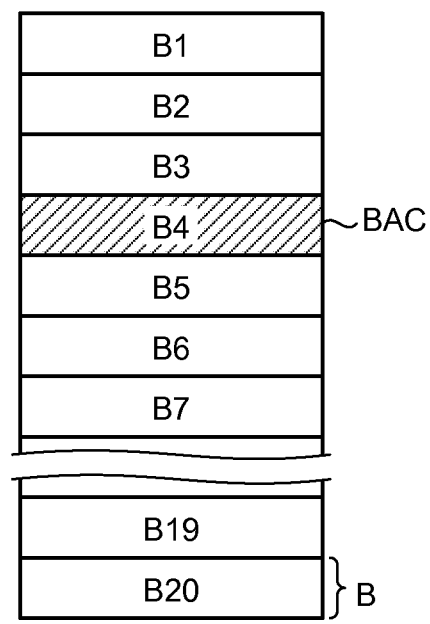
FIG. 13 is a schematic diagram representing the operation example of the touch detection in the display device with a touch detection function according to the first embodiment.
Figure 14:
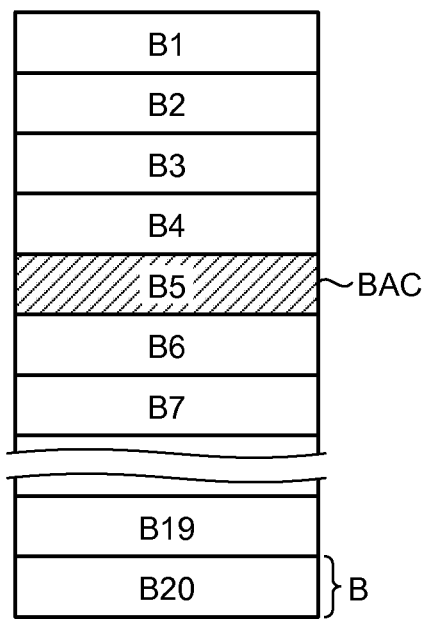
FIG. 14 is a schematic diagram representing the operation example of the touch detection in the display device with a touch detection function according to the first embodiment.
Figure 15:
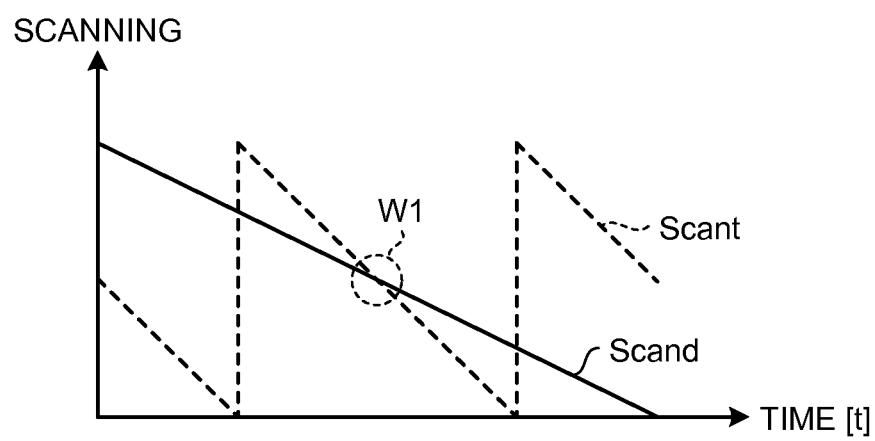
FIG. 15 is an explanatory diagram for explaining display and the touch detection operation in the display device with a touch detection function according to the first embodiment.

FIG. 12, FIG. 13, and FIG. 14 are schematic diagrams representing an operation example of touch detection in the display device with a touch detection function according to the first embodiment. FIG. 15 is an explanatory diagram for explaining display and the touch detection operation in the display device with a touch detection function according to the first embodiment. They illustrate an operation of applying the drive signal VcomAC to each of drive electrode blocks B1 to B20 wherein the drive electrode blocks B1 to B20 correspond to 20 drive electrode blocks B for the drive electrodes COML illustrated in FIG. 7. A drive signal applied block BAC represents the drive electrode block B to which the drive signal VcomAC is being applied and no voltage is applied to the other drive electrode blocks B. Thus, the other drive electrode blocks B are in a state where the potential thereof is not being fixed, what is called a floating state. The drive electrode driver 14 illustrated in FIG. 1 selects the drive electrode block B3 from among the drive electrode blocks B illustrated in FIG. 12 to be targets for the touch detection operation and applies the drive signal VcomAC thereto. Next, the drive electrode driver 14 selects the drive electrode block B4 from among the drive electrode blocks B illustrated in FIG. 13 and applies the drive signal VcomAC thereto. Next, the drive electrode driver 14 selects the drive electrode block B5 from among the drive electrode blocks B illustrated in FIG. 14 and applies the drive signal VcomAC thereto. In this way, the drive electrode driver 14 scans all of the drive electrode blocks B by sequentially selecting the drive electrode block B and applying the drive signal VcomAC thereto. The number of the drive electrode blocks B is not limited to 20.

In the touch detection device 30, one of the drive electrode blocks B illustrated in FIGS. 12 to 14 corresponds to the drive electrode E1 in the above-described basic principle of touch detection. In the touch detection device 30, one of the touch detection electrodes TDL corresponds to the touch detection electrode E2. The touch detection device 30 detects a touch in accordance with the above-described basic principle. As illustrated in FIG. 11, the electrode patterns sterically intersecting with each other form capacitance type touch sensors in a matrix shape. Thus, scanning over the entire touch detection surface of the touch detection device 30 also makes it possible to detect a contact position or a proximity position of the external proximity object.

As illustrated in FIG. 15, in the display unit with a touch detection function 10, the gate driver 12 drives the scanning signal lines GCL to be line-sequentially scanned in a time division manner in order to perform display scanning Scand. As illustrated in FIG. 15, the display unit with a touch detection function 10 also performs touch detection scanning Scant (single such scanning is completed in time W1) by sequentially selecting and driving the drive electrode block B by the drive electrode driver 14. As illustrated in FIG. 15, the touch detection scanning Scant is performed twice as fast as the scanning speed of the display scanning Scand. In this manner, the touch detection scanning speed is set to be faster than the display scanning speed in the display device with a touch detection function 1. This makes it possible to immediately respond to a touch by an external proximity object, which is externally positioned in proximity, thereby improving the responsive property to touch detection. A relationship between the touch detection scanning Scant and the display scanning Scand is not limited to the relationship illustrated in FIG. 15. For example, the touch detection scanning Scant may be performed at a scanning speed greater than or equal to twice as fast as that of the display scanning Scand or at a scanning speed smaller than or equal to twice as fast as that of the display scanning Scand.

Drive Signal Generator and Drive Electrode Driver

Figure 16:
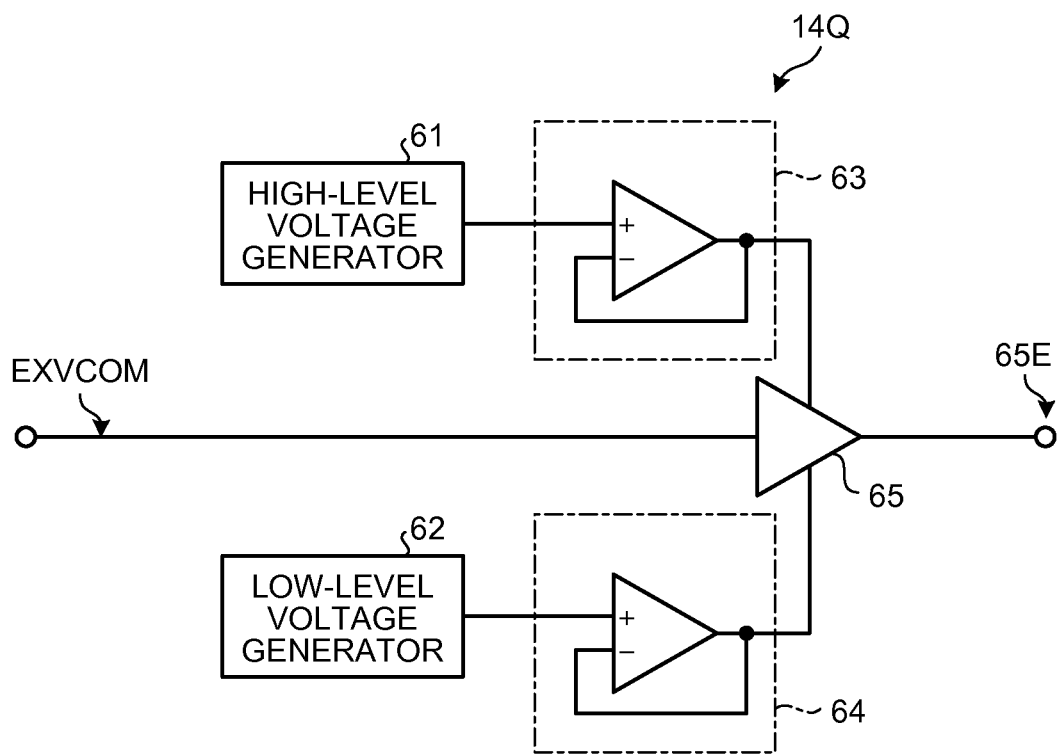
FIG. 16 is a block diagram illustrating a drive signal generator of a drive electrode driver according to the first embodiment.

FIG. 16 is a block diagram illustrating the drive signal generator of the drive electrode driver according to the first embodiment. A drive signal generator 14Q includes, a high-level voltage generator 61, a low-level voltage generator 62, buffers 63 and 64, and a switching circuit 65.

The high-level voltage generator 61 generates a high-level voltage of the drive signal VcomAC. The low-level voltage generator 62 generates a direct-current voltage of the display drive voltage VcomDC. The voltage generated by this low-level voltage generator 62 is used also as a low-level voltage of the drive signal VcomAC. The buffer 63 outputs the voltage supplied from the high-level voltage generator 61 while performing impedance conversion thereto so as to be supplied to the switching circuit 65. The buffer 64 outputs the voltage supplied from the low-level voltage generator 62 while performing impedance conversion thereto so as to be supplied to the switching circuit 65. The switching circuit 65 generates the drive signal VcomAC based on a drive control signal EXVCOM by alternately repeating a case where the drive control signal EXVCOM is at a high level and a case where the drive control signal EXVCOM is at a low level. When the drive control signal EXVCOM is at a high level, the switching circuit 65 outputs the voltage supplied from the buffer 63. When the drive control signal EXVCOM is at a low level, the switching circuit 65 outputs the voltage supplied from the buffer 64. Based on the drive control signal EXVCOM, when the drive control signal EXVCOM is at a low level, the switching circuit 65 outputs the voltage supplied from the buffer 64 as the direct-current voltage of the display drive voltage VcomDC. The buffers 63 and 64 are formed by voltage followers, for example. The voltage outputted by the switching circuit 65 is outputted to an output terminal 65E.

Figure 17:
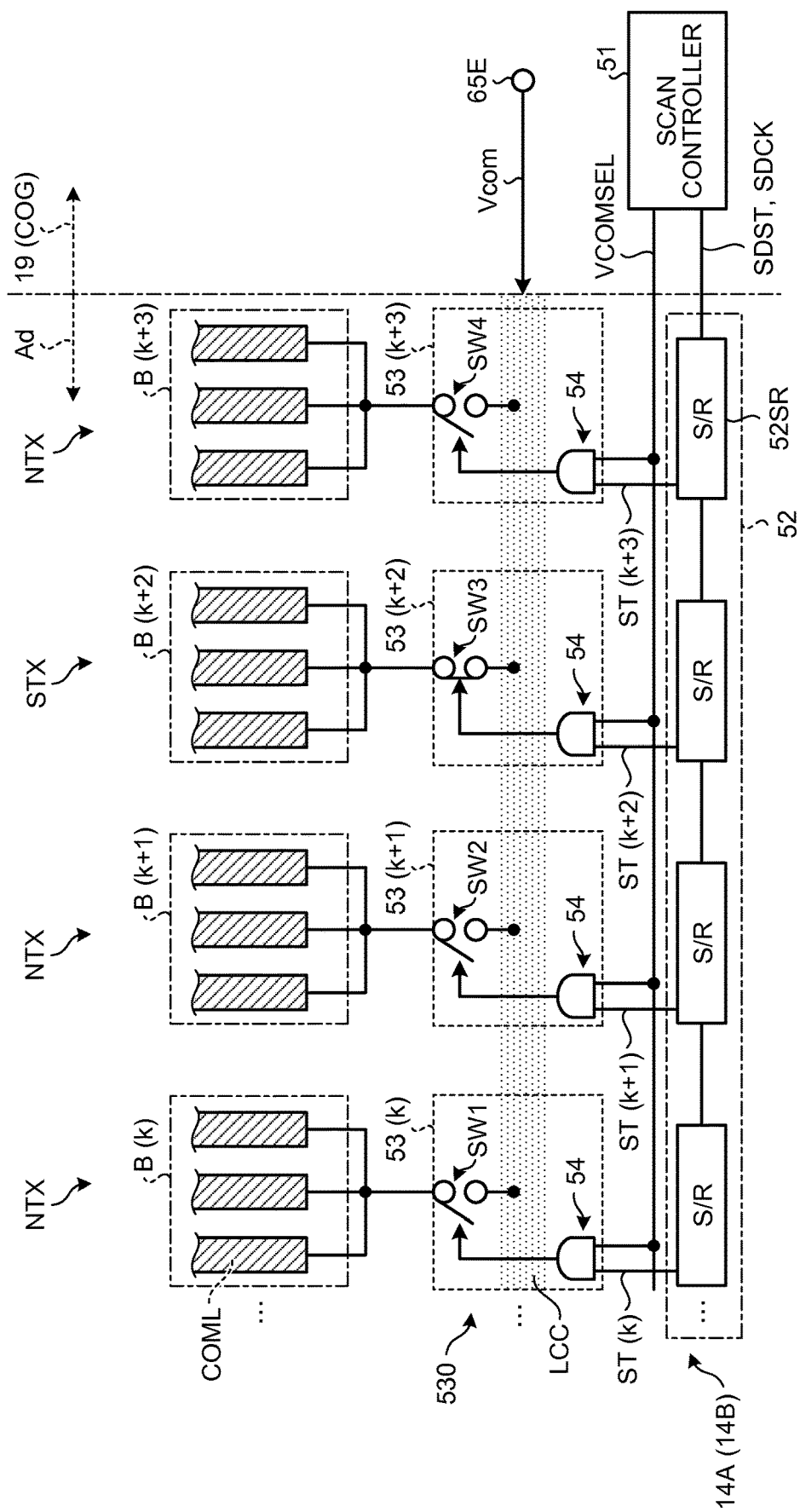
FIG. 17 is a block diagram illustrating the drive electrode driver according to the first embodiment.

FIG. 17 is a block diagram illustrating the drive electrode driver according to the first embodiment. Each of the drive electrode scanning unit 14A and 14B includes a scanning controller 51, a touch detection scanning unit 52, and a drive unit 530. The drive unit 530 includes drive parts 53($k$) to 53($k$+3) as many as the drive electrode blocks B. The scanning controller 51 is implemented in the COG 19. The touch detection scanning unit 52 and the drive unit 530 are disposed in the frame around the display area Ad. Hereinafter, when referring to arbitrary one of the plurality of drive parts 53($k$) to 53($k$+3), the drive part 53 is simply used.

The scanning controller 51 supplies a control signal SDCK and a scanning start signal SDST to the touch detection scanning unit 52 based on the control signal supplied from the control unit 11. From its output terminal, the wiring LCC is supplied with one of the display drive voltage VcomDC and the drive signal VcomAC outputted from the above-described drive signal generator 14Q through the output terminal 65E. The scanning controller 51 supplies a drive electrode selection signal VCOMSEL to the drive unit 530. The drive electrode selection signal VCOMSEL is a signal for identifying a period during which the drive signal VcomAC is supplied to the drive electrodes COML from the drive signal generator 14Q through the wiring LCC.

The touch detection scanning unit 52 includes shift registers 52SR and generates scanning signals ST(k), ST(k+1), ST(k+2), ST(k+3), . . . for selecting the drive electrodes COML to which the drive signal VcomAC is applied. Specifically, in the touch detection scanning unit 52, the shift register 52SR is sequentially transferred for each transfer stage and sequentially selected in synchronization with the control signal SDCK with the scanning start signal SDST supplied by the scanning controller 51 used as a trigger. The selected shift register 52SR sends out the scanning signal ST(k), ST(k+1), ST(k+2), ST(k+3), . . . to its corresponding logical product circuit 54 in the drive unit 530. In the touch detection scanning unit 52, in a case where the selected shift register 52SR supplies a high-level signal to the (k+2)th drive part 53($k$+2) as the (k+2)th scanning signal ST(k+2), for example, this drive part 53($k$+2) applies the drive signal VcomAC to the plurality of drive electrodes COML belonging to the (k+2)th drive electrode block B(k+2). Hereinafter, when referring to arbitrary one of the scanning signals ST(k), ST(k+1), ST(k+2), ST(k+3), . . . , the scanning signal ST may be used.

The drive unit 530 is a circuit for applying the display drive voltage VcomDC or the drive signal VcomAC supplied from the drive signal generator 14Q to the drive electrodes COML based on the scanning signal ST supplied from the touch detection scanning unit 52 and the drive electrode selection signal VCOMSEL supplied from the scanning controller 51. The drive parts 53 are provided in one-to-one correspondence with the output signals of the touch detection scanning unit 52. The drive part 53 applies the drive signal Vcom to the corresponding one of the drive electrode blocks B.

The drive part 53 includes the logical product circuit 54, and a single selection switch SW1 (SW2, SW3, or SW4) for each drive electrode block B. The logical product circuit 54 generates and outputs a logical product (AND) of the scanning signal ST provided by the touch detection scanning unit 52 and the drive electrode selection signal VCOMSEL supplied from the scanning controller 51. The logical product circuit 54 has a buffer function performing amplification to an amplitude level capable of performing ON and OFF control for the selection switch SW1 (SW2, SW3, or SW4). ON and OFF control for the selection switch SW1 is performed based on the signal supplied from the logical product circuit 54. One end of the selection switch SW1 is coupled to the wiring LCC, and the other end of the selection switch SW1 is coupled to the plurality of drive electrodes COML contained in the corresponding drive electrode block B.

With this configuration, the drive part 53 outputs the drive signal VcomAC as the drive signal Vcom if the scanning signal ST is at a high level and the drive electrode selection signal VCOMSEL is at a high level. If the scanning signal ST is at a low level and the drive electrode selection signal VCOMSEL is at a high level, the drive part 53 decouples the drive electrode block B from the wiring LCC so as to obtain a floating state. In a case where the liquid crystal display unit 20 is performing a display operation, the drive part 53 outputs the display drive voltage VcomDC as the drive signal Vcom if the drive electrode selection signal VCOMSEL is at a low level and all of the selection switches SW1 (SW2, SW3, and SW4) provided one for each drive electrode block B are closed.

Herein, a drive electrode block B selected as an output destination of the drive signal VcomAC is defined as a selected drive electrode block STX. A drive electrode block B not being selected as an output destination of the drive signal VcomAC is defined as an unselected drive electrode block NTX. For example, since the drive part 53($k$+2) illustrated in FIG. 17 applies the drive signal VcomAC to the plurality of drive electrodes COML belonging to the (k+2)th drive electrode block B(k+2), the selected drive electrode block STX is the drive electrode block B(k+2). The drive electrode blocks B(k), B(k+1), and B(k+3) not being selected as the output destination of the drive signal VcomAC are the unselected drive electrode blocks NTX.

Herein, the TFT substrate 21 corresponds to a specific example of a "substrate" in the present disclosure. The pixel electrode 22 corresponds to a specific example of a "pixel electrode" in the present disclosure. The pixel signal line SGL corresponds to a specific example of a "signal line" in the present disclosure. The drive electrode COML corresponds to a specific example of a "drive electrode" in the present disclosure. The liquid crystal element LC corresponds to a specific example of a "display functional layer" in the present disclosure. The source driver 13 and the drive electrode driver 14 correspond to a specific example of a "scanning drive unit" in the present disclosure. The touch detection electrode TDL corresponds to a specific example of a "touch detection electrode" in the present disclosure.

1-1B. Operations and Functions

Figure 18:
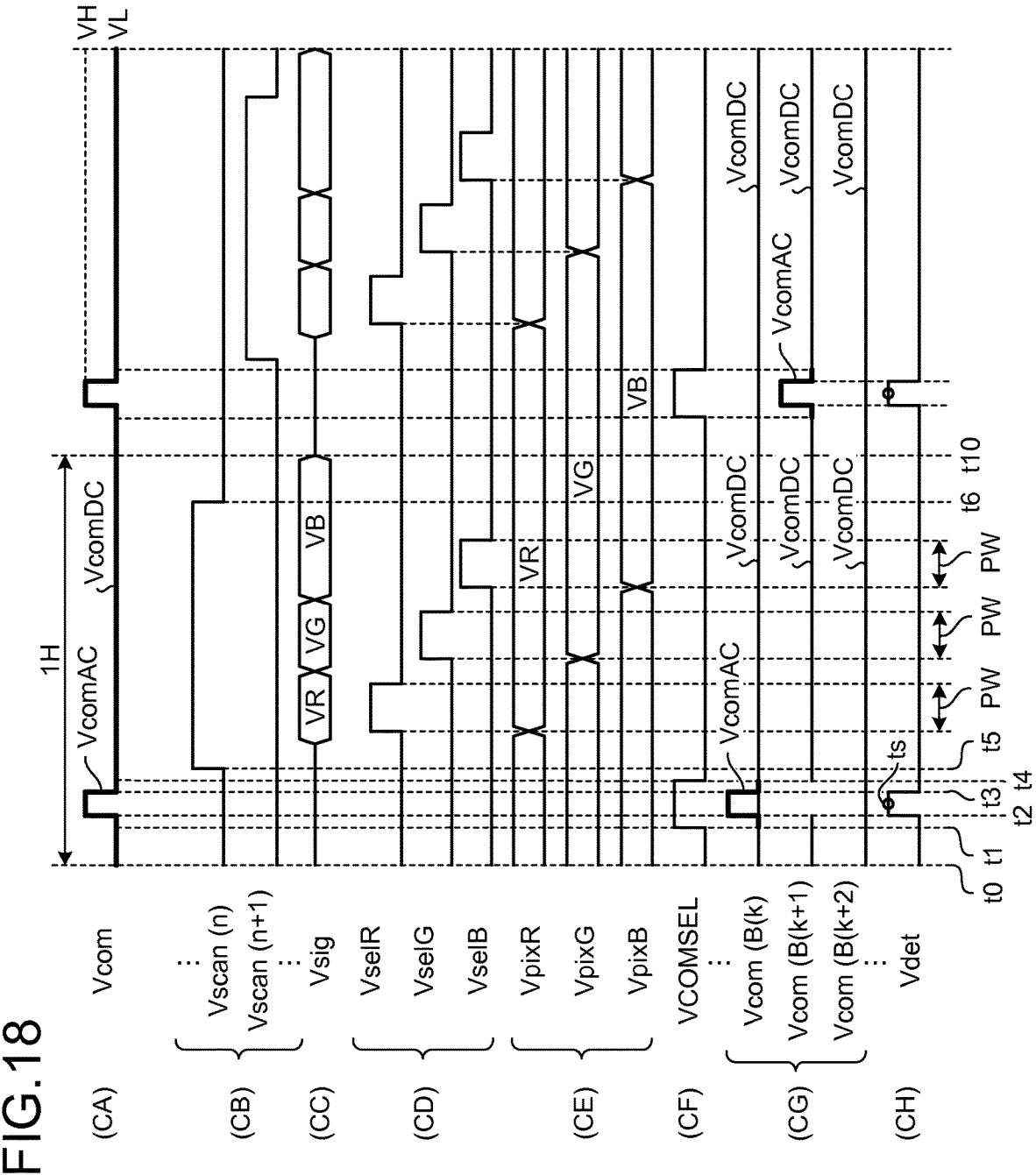
FIG. 18 is an explanatory diagram for illustrating exemplary timing waveforms in the display device with a touch detection function.
Figure 19:
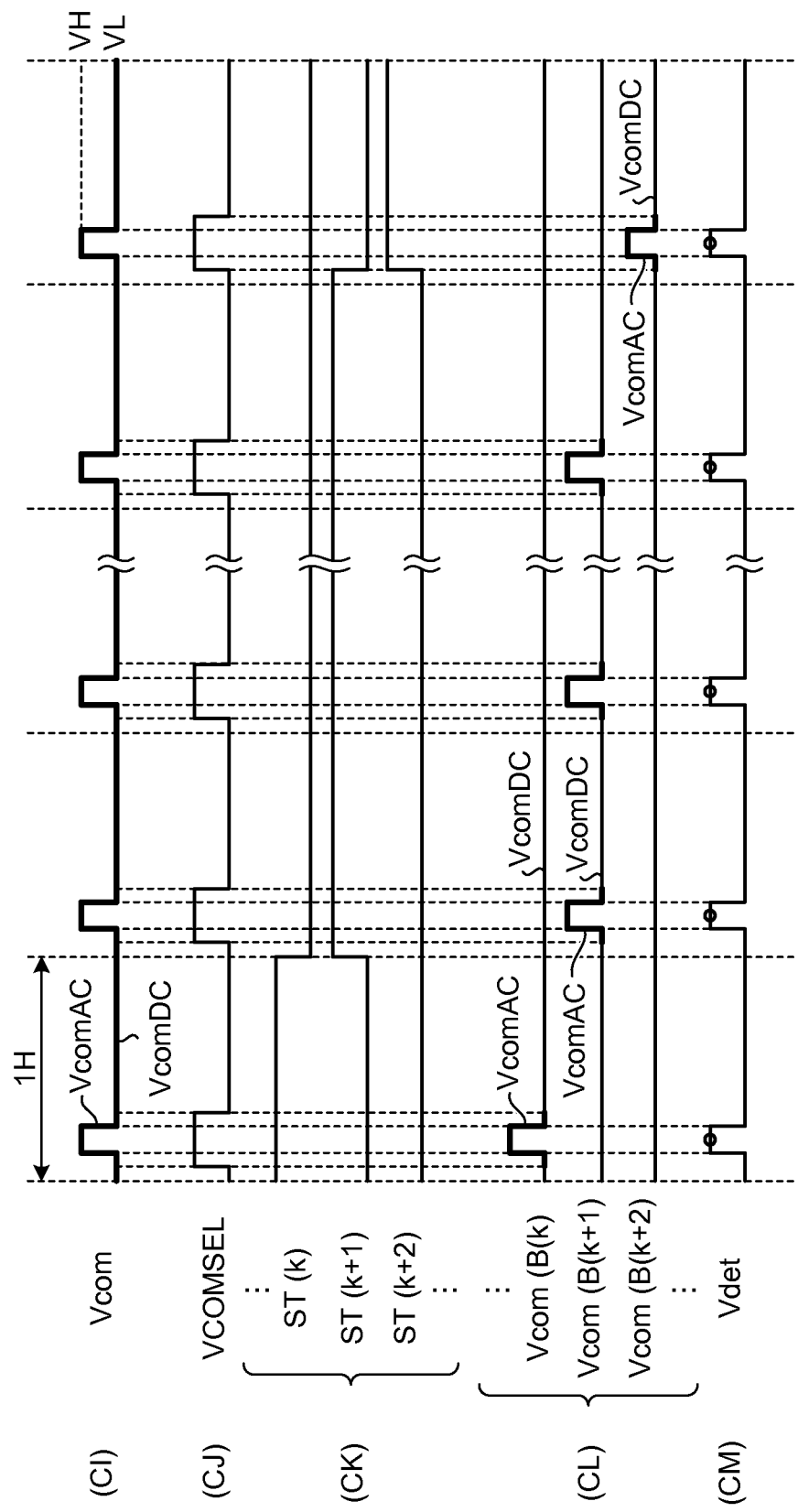
FIG. 19 is an explanatory diagram for representing an operation example of touch detection scanning.
Figure 20:
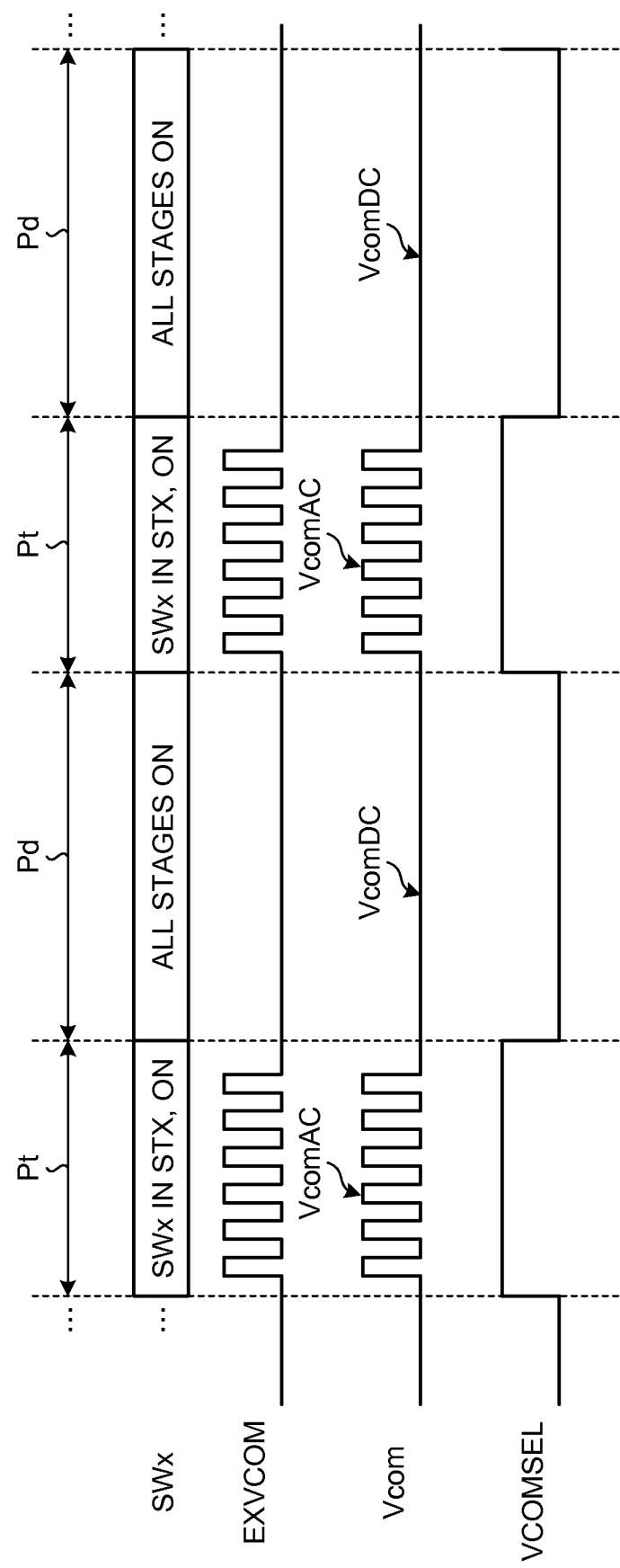
FIG. 20 is an explanatory diagram for illustrating a relationship between waveforms of a drive control signal and an AC drive signal.

Next, operations and functions of the display device with a touch detection function 1 according to the first embodiment will be described. In the following description, the drive signal Vcom used as a drive signal for display is denoted as the display drive voltage VcomDC and the drive signal Vcom used as a drive signal for touch detection is denoted as the drive signal VcomAC. FIG. 18 is an explanatory diagram for illustrating exemplary timing waveforms in the display device with a touch detection function 1. FIG. 19 is an explanatory diagram for representing an operation example of touch detection scanning. FIG. 20 is an explanatory diagram for illustrating a relationship between waveforms of the drive control signal EXVCOM and the drive signal VcomAC.

Outline of General Operation

The control unit 11 supplies control signals to the gate driver 12, the source driver 13, the drive electrode driver 14, and the touch detection unit 40, respectively, based on the video signal Vdisp supplied from outside and controls them so as to be operated in synchronization with one another. The gate driver 12 supplies the scanning signal Vscan to the liquid crystal display unit 20 in a display operation period Pd illustrated in FIG. 20 and sequentially selects one horizontal line to be driven for display. The source driver 13 and the source selector 13S provide the pixel signal Vpix to each of the pixels Pix making up one horizontal line selected by the gate driver 12 in the display operation period Pd.

The drive electrode driver 14 applies the display drive voltage VcomDC to the drive electrode block B associated with one horizontal line in the display operation period Pd. In a touch detection operation period Pt, the drive signal VcomAC with a frequency higher than that of the display drive voltage VcomDC is sequentially applied to each of the drive electrode blocks B associated with the touch detection operation, thereby sequentially selecting one detection block. The display unit with a touch detection function 10 performs a display operation in the display operation period Pd based on the signals provided by the gate driver 12, the source driver 13, and the drive electrode driver 14. The display unit with a touch detection function 10 performs a touch detection operation in the touch detection operation period Pt based on the drive signal VcomAC provided by the drive electrode driver 14 and outputs the touch detection signal Vdet from the touch detection electrode TDL. The touch detection signal amplifier 42 amplifies and then outputs the touch detection signal Vdet. The A/D convertor 43 converts the analog signal outputted from the touch detection signal amplifier 42 into a digital signal at timings synchronized with the drive signal VcomAC. The signal processor 44 detects the presence or absence of a touch with respect to the touch detection device 30 based on the output signal from the A/D convertor 43. When a touch is detected in the signal processor 44, the coordinate extractor 45 obtains the touch panel coordinate and outputs the touch panel coordinate as the signal output Vout.

Detailed Operations

Detailed operations of the display device with a touch detection function 1 will be described next.

(CA) illustrated in FIG. 18 represents a waveform of the drive signal Vcom. (CB) illustrated in FIG. 18 represents waveforms of the scanning signals Vscan. (CC) illustrated in FIG. 18 represents a waveform of the image signal Vsig. (CD) illustrated in FIG. 18 represents waveforms of the switch control signals Vsel. (CE) illustrated in FIG. 18 represents waveforms of the pixel signals Vpix. (CF) illustrated in FIG. 18 represents a waveform of the drive electrode selection signal VCOMSEL. (CG) illustrated in FIG. 18 represents waveforms of the drive signals Vcom. (CH) illustrated in FIG. 18 represents a waveform of the touch detection signal Vdet.

In the display device with a touch detection function 1, the touch detection operation and the display operation are performed in every one horizontal period (1H). In the display operation, the gate driver 12 performs display scanning by sequentially applying the scanning signal Vscan to each of the scanning signal lines GCL. In the touch detection operation, the drive electrode driver 14 performs the touch detection scanning by sequentially applying the drive signal VcomAC to each of the drive electrode blocks B. Then, the touch detection unit 40 detects a touch based on the touch detection signal Vdet outputted from the touch detection electrode TDL. The details thereof will be explained below.

First, after one horizontal period (1H) is started at a timing t0, the scanning controller 51 of the drive electrode driver 14 changes the voltage of the drive electrode selection signal VCOMSEL from a low level to a high level at a timing t1 (FIG. 18 (CF)). In the drive electrode driver 14, the selection switch SW1 is thereby put in an ON state in the k-th drive part 53(k) associated with the touch detection operation. As a result, the drive signal VcomAC (FIG. 18 (CA)) generated by the drive signal generator 14Q is applied, through that selection switch SW1, to the drive electrodes COML making up the corresponding k-th drive electrode block B(k) as the drive signal Vcom(B(k)) (FIG. 18 (CG)). In the drive parts 53 excluding the drive part 53(k), the selection switches SW2, SW3, and SW4 excluding the selection switch SW1 are put in an OFF state. As a result, the drive electrodes COML excluding the drive electrodes COML making up the drive electrode block B(k) are put in a floating state. In this case, a fixed potential may be provided to the pixel signal lines SGL by fixing all of the switch control signals VselR, VselG, and VselB at a high level and making all of the switches SWR, SWG, and SWB perform an ON operation. Supplying the fixed potential to the pixel signal lines SGL can suppress an effect of a potential change on the drive electrode COML and reduce noise to the pixel signal lines SGL.

Next, the drive signal generator 14Q changes the voltage of the drive signal VcomAC from a low level to a high level at a timing t2 (FIG. 18 (CA)). Specifically, in the drive signal generator 14Q, the buffer 63 supplies a current through the switching circuit 65 based on the drive control signal EXVCOM. As a result, the voltage of the drive signal VcomAC is changed from a low level to a high level. Along with this, an AC rectangular wave changing from a low level to a high level is added to the drive signal Vcom(B(k)) applied to the k-th drive electrode block B(k) (FIG. 18 (CG)). This drive signal Vcom(B(k)) is propagated to the touch detection electrode TDL through the capacitance and the touch detection signal Vdet is thereby changed (FIG. 18 (CH)). The AC rectangular wave may be a single rectangular wave.

Next, at a sampling timing ts, the A/D convertor 43 of the touch detection unit 40 performs A/D conversion on the output signal of the touch detection signal amplifier 42 to which this touch detection signal Vdet has been inputted (FIG. 18 (CH)). The signal processor 44 of the touch detection unit 40 performs touch detection based on the A/D conversion results collected over a plurality of horizontal periods.

Next, at a timing t3, the drive signal generator 14Q changes the voltage of the drive signal VcomAC to the drive signal Vcom (display drive voltage VcomDC) which is a drive voltage for display (FIG. 18 (CA)). Specifically, in the drive signal generator 14Q, the buffer 64 performs current sinking through the switching circuit 65 based on the drive control signal EXVCOM, thereby changing the voltage of the drive signal VcomAC to the display drive voltage VcomDC. Along with this, the drive signal Vcom(B(k)) applied to the k-th drive electrode block B(k) also changes from a high level to a low level (FIG. 18(CG)), thereby changing the touch detection signal Vdet (FIG. 18 (CH)).

Next, at a timing t4, the scanning controller 51 of the drive electrode driver 14 changes the voltage of the drive electrode selection signal VCOMSEL from a high level to a low level (FIG. 18 (CF)). Accordingly, in the drive electrode driver 14, the selection switches SW2, SW3, SW4, . . . are put in the ON state except for in the drive part 53(k). In other words, all of the switches SW1 to SW4 are put in the ON state. The display drive voltage VcomDC (FIG. 18 (CA)) generated by the drive signal generator 14Q is applied to the drive electrodes COML in the corresponding drive electrode block B through all of the selection switches SW1 to SW4 (FIG. 18 (CG)).

Next, at a timing t5, the gate driver 12 applies the scanning signal Vscan to the n-th row scanning signal line GCL(n) associated with the display operation, thereby changing the scanning signal Vscan(n) from a low level to a high level (FIG. 18 (CB)). Then, the source driver 13 and the source selector 13S apply the pixel signal Vpix to the pixel signal lines SGL (FIG. 18 (CE)) and thereby perform display of the pixels Pix in one horizontal line associated with the n-th row scanning signal line GCL(n).

Specifically, the gate driver 12 first changes the scanning signal Vscan(n) from a low level to a high level at the timing t5, thereby selecting one horizontal line associated with the display operation. Then, the source driver 13 supplies a pixel voltage VR for a red sub-pixel SPix to the source selector 13S as the image signal Vsig (FIG. 18 (CC)). The source driver 13 also generates the switch control signal VselR to be at a high level in the period during which that pixel voltage VR is being provided and supplies it to the source selector 13S (FIG. 18 (CD)). Then, the source selector 13S demultiplexes the pixel voltage VR provided by the source driver 13 from the image signal Vsig by putting the switch SWR in the ON state in the period during which the switch control signal VselR is at a high level (write period PW). The source selector 13S supplies it as the pixel signal VpixR to the red sub-pixel SPix associated with one horizontal line through the pixel signal line SGL (FIG. 18 (CE)). Since this pixel signal line SGL is put in a floating state after the switch SWR is put in the OFF state, the voltage of this pixel signal line SGL is maintained (FIG. 18 (CE)). Similarly, the source driver 13 supplies a pixel voltage VG for a green sub-pixel SPix to the source selector 13S together with the corresponding switch control signal VselG (FIG. 18 (CC) and (CD)). The source selector 13S demultiplexes this pixel voltage VG from the image signal Vsig based on the switch control signal VselG. The source selector 13S supplies it as the pixel signal VpixG to the green sub-pixel SPix associated with one horizontal line through the pixel signal line SGL (FIG. 18 (CE)). Thereafter, the source driver 13 similarly supplies a pixel voltage VB for a blue sub-pixel SPix to the source selector 13S together with the corresponding switch control signal VselB (FIG. 18 (CC) and (CD)). The source selector 13S demultiplexes this pixel voltage VB from the image signal Vsig based on the switch control signal VselB. The source selector 13S supplies it as the pixel signal VpixB to the blue sub-pixel SPix associated with one horizontal line through the pixel signal line SGL (FIG. 18 (CE)).

Next, at a timing t6, the gate driver 12 changes the scanning signal Vscan(n) for the n-th row scanning signal line GCL from a high level to a low level (FIG. 18 (CB)). Each of the sub-pixels SPix for one horizontal line associated with the display operation are thereby electrically disconnected from the pixel signal line SGL.

At a timing t10, one horizontal period is ended and a new horizontal period is started.

Subsequently, by repeating the above-described operations, a display operation for the entire display screen is performed by means of line sequential scanning, and by scanning drive electrode blocks B one by one as will be described below, a touch detection operation on the entire touch detection surface is performed in the display device with a touch detection function 1.

(CI) illustrated in FIG. 19 represents a waveform of the drive signal Vcom. (CJ) illustrated in FIG. 19 represents a waveform of the drive electrode selection signal VCOMSEL. (CK) illustrated in FIG. 19 represents waveforms of the scanning signals ST. (CL) illustrated in FIG. 19 represents waveforms of the drive signals Vcom. (CM) illustrated in FIG. 19 represents a waveform of the touch detection signal Vdet.

As illustrated in FIG. 19, the drive electrode driver 14 performs touch detection scanning by sequentially applying the drive signal VcomAC to the corresponding drive electrode block B (FIG. 19 (CL)) based on the scanning signal ST (FIG. 19 (CK)) generated by the touch detection scanning unit 52. At this time, the drive electrode driver 14 applies the drive signal VcomAC to each of the drive electrode blocks B over a predetermined plurality of horizontal periods, for example (FIG. 19 (CL)). In every one horizontal period 1H, the touch detection unit 40 samples the touch detection signal Vdet based on this drive signal VcomAC. After the sampling in the last horizontal period among the predetermined plurality of horizontal periods is completed, the signal processor 44 detects the presence or absence of a touch with respect to the area corresponding to that drive electrode block B, or the like, based on these plurality of sampling results. Since touch detection is performed based on the plurality of sampling results in this manner, it becomes possible to analyze the sampling results statistically and to suppress deterioration in the S/N ratio due to a variation in sampling results. Thus, the touch detection accuracy can be enhanced.

As illustrated in FIG. 20, the display device with a touch detection function 1 according to the first embodiment supplies the drive signal Vcom (the display drive voltage VcomDC and the drive signal VcomAC) to the drive electrode COML in a time division manner separately in the touch detection operation (touch detection operation period Pt) and in the display operation (display period Pd). Although the rectangular wave of the drive signal VcomAC illustrated in FIG. 18 or FIG. 19 is schematically illustrated as one rectangular wave, it may have amplitude a plurality of times as illustrated in FIG. 20. As described above, the display device with a touch detection function 1 according to the first embodiment may supply the drive signal Vcom (the display drive voltage VcomDC and the drive signal VcomAC) to the drive electrode COML in a time division manner separately in the touch detection operation (touch detection operation period Pt) and in the display operation (display period Pd) in one display horizontal period which is a display period for one horizontal line. Alternatively, the display device with a touch detection function 1 according to the first embodiment may supply the drive signal Vcom (the display drive voltage VcomDC and the drive signal VcomAC) to the drive electrode COML in a time division manner separately in a plurality of touch detection operations (touch detection operation periods Pt) and in a plurality of display operations (display periods Pd) in one display horizontal period. The display device with a touch detection function 1 according to the first embodiment may process display operations for a plurality of horizontal periods during one display period Pd separately in the touch detection operation (touch detection operation period Pt) and in the display operation (display period Pd). The display device with a touch detection function 1 according to the first embodiment may supply the drive signal Vcom (the display drive voltage VcomDC and the drive signal VcomAC) to the drive electrode COML in a time division manner separately in a plurality of touch detection operations (touch detection operation periods Pt) and a plurality of display operations (display periods Pd) in one frame period during which display for the entire screen of the display area Ad is performed.

The drive electrode COML functions as the drive electrode for the liquid crystal display unit 20 and also as the drive electrode for the touch detection device 30. Therefore, there is a possibility that the drive signal Vcom influences the both. Thus, the drive signal Vcom is applied to the drive electrode COML separately in the display operation period Pd during which the display operation is performed and in the touch detection operation period Pt during which the touch detection operation is performed. The drive electrode driver 14 applies the drive signal Vcom as a display drive voltage in the display operation period Pd during which the display operation is performed. The drive electrode driver 14 applies the drive signal Vcom as a touch drive signal in the touch detection operation period Pt during which the touch detection operation is performed. In this manner, in the display device with a touch detection function 1, the display drive voltage VcomDC and the drive signal VcomAC are supplied to the same wiring LCC at different times. The waveform of the drive signal VcomAC takes a waveform synchronized with the rectangular wave of the drive control signal EXVCOM.

As illustrated in FIG. 20, in the touch detection operation, one of the switches SWx for the selected drive electrode block STX performs an ON operation (closing operation) and touch detection scanning is performed by applying the rectangular wave of the drive signal VcomAC. Also in the touch detection operation, all of the selection switches SWx for the unselected drive electrode blocks NTX perform an OFF operation (opening operation) and are in a floating state where the potential of the unselected drive electrode block NTX is not fixed. In this case, in order to sufficiently set all of the selection switches SWx for the unselected drive electrode blocks NTX to an OFF state, it is preferred to adjust the gate potential of the selection switches SWx for the unselected drive electrode blocks NTX. For example, when the amplitude of the drive signal VcomAC is defined as VMA, it is desirable that the gate potential be adjusted by applying, between the gate and drain of the selection switch SWx, a reverse bias which is "greater than or equal to the amplitude VMA of the drive signal VcomAC and smaller than or equal to a gate-drain withstanding pressure of the selection switch SWx" so as to allow for the OFF operation of the selection switch SWx. The "drain" as used herein refers to a coupling end to which the drive electrode COML is coupled. As a result, the malfunction of the selection switches SWx, which is caused by noise received by the unselected drive electrode blocks NTX in a floating state, is suppressed.

The display device with a touch detection function 1 makes all of the SW1 to SW4 perform the ON operation and applies the display drive voltage VcomDC to the drive electrodes COML in the display period Pd.

1-1C. Advantageous Effects

Figure 21:
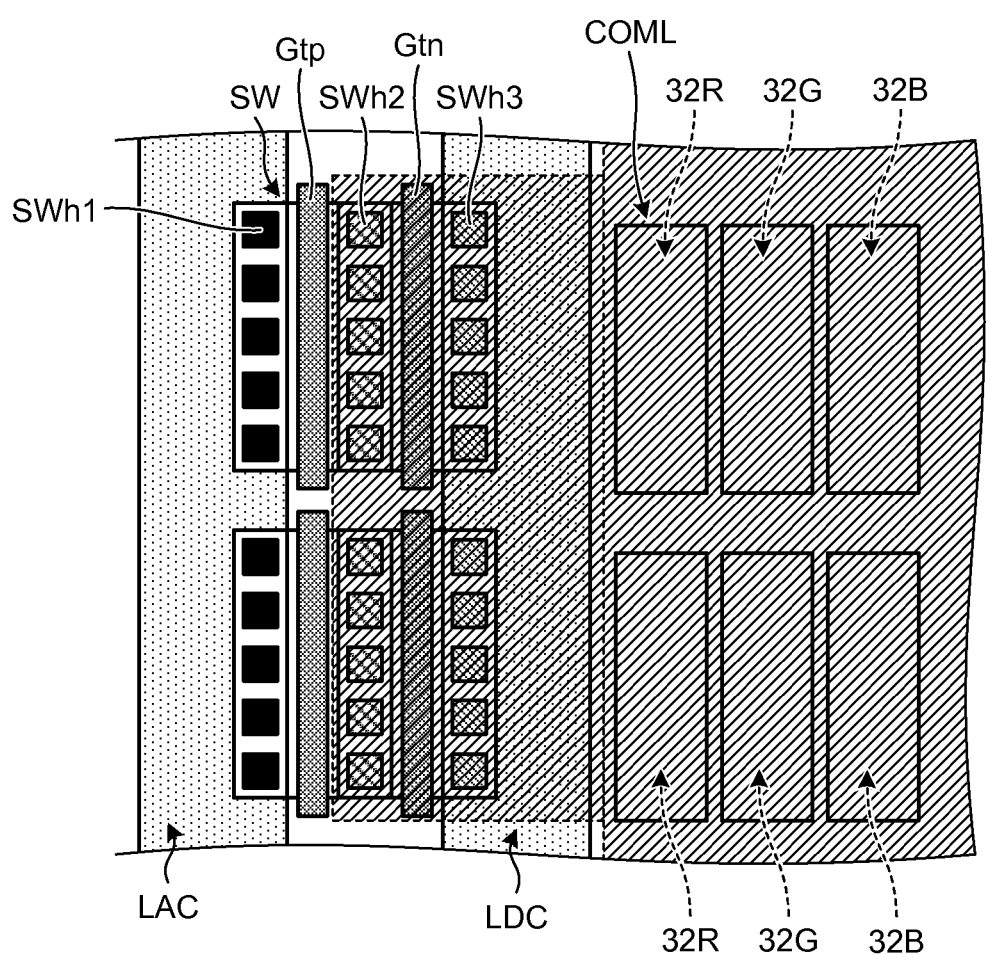
FIG. 21 is an explanatory diagram for explaining a layout example of wirings and a switch with respect to a drive electrode according to a comparative example.
Figure 22:
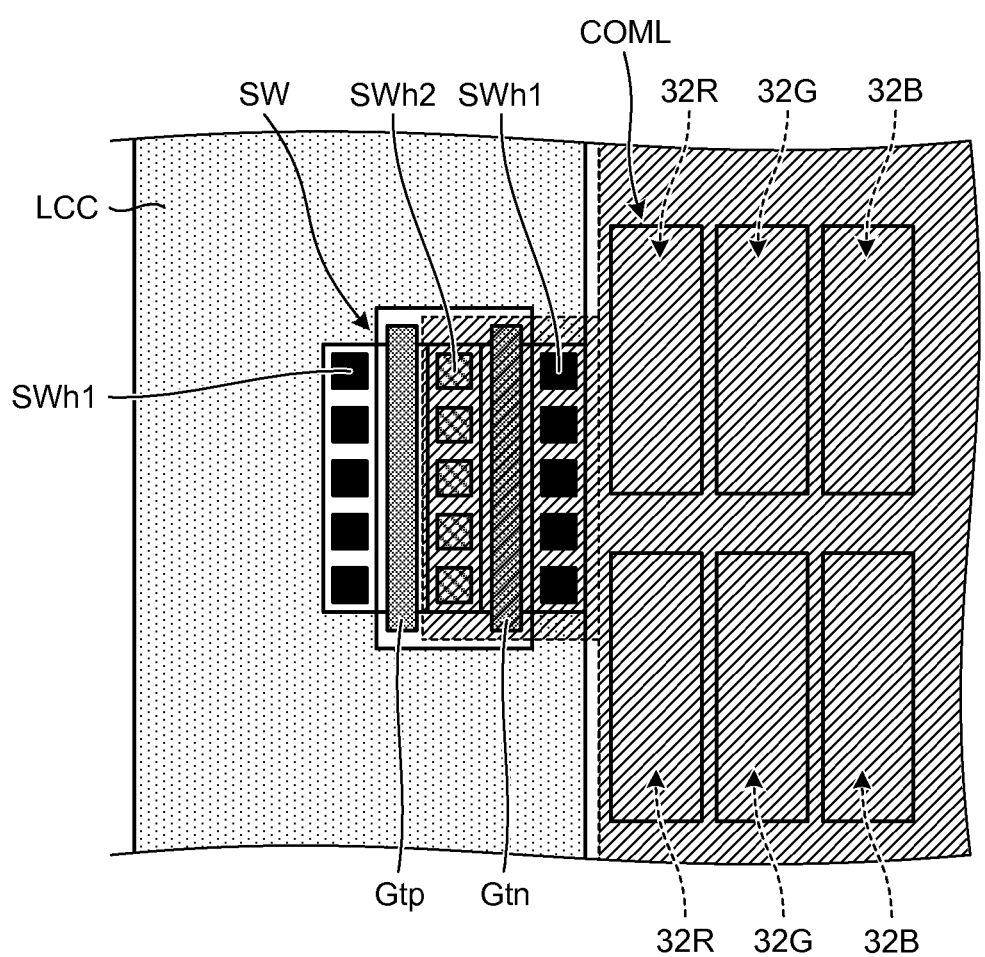
FIG. 22 is an explanatory diagram for explaining a layout example of a wiring and a switch with respect to a drive electrode according to the first embodiment.
Figure 23:
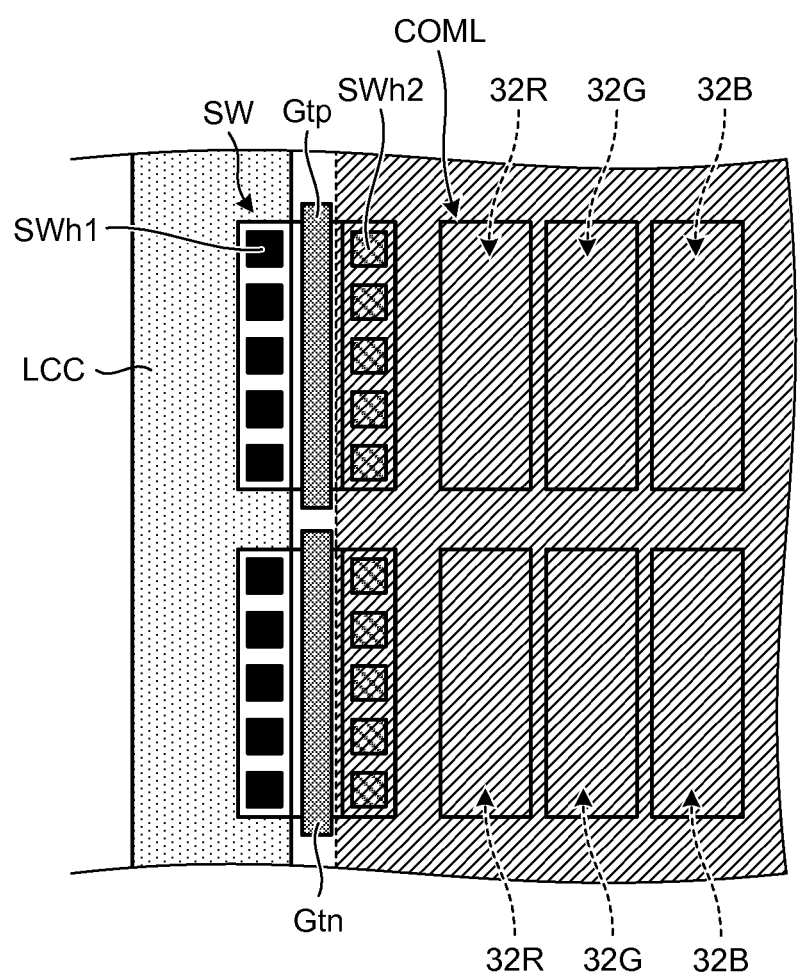
FIG. 23 is an explanatory diagram for explaining a layout example of a wiring and a switch with respect to a drive electrode according to a modification of the first embodiment.

FIG. 21 is an explanatory diagram for explaining a layout example of wirings and a switch with respect to a drive electrode according to a comparative example. FIG. 22 is an explanatory diagram for explaining a layout example of a wiring and a switch with respect to a drive electrode according to the first embodiment. FIG. 23 is an explanatory diagram for explaining a layout example of a wiring and a switch with respect to a drive electrode according to a modification of the first embodiment. As illustrated in FIG. 21, in the display panel with a touch detection function described in JP-A-2012-221485, a wiring LDC for supplying the display drive voltage VcomDC to the drive electrode COML and a wiring LAC for supplying the drive signal VcomAC to the drive electrode COML need to be arranged in the frame area. For example, in a liquid crystal display device using liquid crystals in the transverse electric field mode such as FFS, the display functional layer tends to operate in a more stable manner when the wiring LDC is disposed closer to the pixel corresponding to the color regions 32R, 32G, and 32B. Thus, the selection switch SW is disposed between the wirings LAC and LDC. The selection switch SW is a CMOS switch and includes a transistor having an N-channel gate electrode Gtn and a transistor having a P-channel gate electrode Gtp. The selection switch SW is coupled to electrically-conductive coupling conductors SWh1, coupling conductors SWh2, and coupling conductors SWh3. The coupling conductors SWh1 are coupled to the wiring LAC. The coupling conductors SWh3 are coupled to the wiring LDC. The coupling conductors SWh2 are coupled to the drive electrode COML. Thus, the selection switch SW can select one of coupling between the coupling conductors SWh1 and the coupling conductors SWh2 and coupling between the coupling conductors SWh3 and the coupling conductors SWh2 based on signals from the scanning controller 51 to the gate electrodes Gtp and Gtn.

On the other hand, in the display device with a touch detection function 1, the above-described two wirings LAC and LDC can be combined together and a coupling resistance or size of the selection switch SW can be halved as illustrated in FIG. 22. For example, the selection switch SW according to the first embodiment is a CMOS switch and coupled to the electrically-conductive coupling conductors SWh1 and SWh2. The coupling conductors SWh1 are coupled to the wiring LCC. The coupling conductors SWh2 are coupled to the drive electrode COML. The selection switch SW can open or close coupling between the coupling conductors SWh1 and the coupling conductors SWh2 according to signals from the scanning controller 51 to the gate electrodes Gtp and Gtn. The selection switch illustrated in FIG. 22 can increase the number of couplings between the coupling conductors SWh1 and the coupling conductors SWh2 as compared with the selection switch illustrated in FIG. 21 if the same installation area as the selection switch illustrated in FIG. 21 is employed. Thus, the selection switch SW according to the first embodiment can reduce the coupling resistance between the coupling conductors SWh1 and the coupling conductors SWh2. The selection switch SW illustrated in FIG. 22 can be downsized as compared with the selection switch SW illustrated in FIG. 21 if the number of couplings between the coupling conductors SWh1 and the coupling conductors SWh2 is the same as that in the selection switch SW illustrated in FIG. 21.

As illustrated in FIG. 23, the occupied proportion of the selection switch SW to the width of the frame Gd can be reduced by arranging the transistor having the gate electrode Gtp and the transistor having the gate electrode Gtn in the extending direction of the wiring LCC in the selection switch SW.

The unselected drive electrode block NTX is in a state where the potential thereof is not fixed, i.e., in a floating state. Thus, a parasitic capacitance generated between the touch detection electrode TDL and the unselected drive electrode block NTX is reduced. If the parasitic capacitance is reduced, the waveform rise and fall time constant of the drive signal VcomAC provided to the wiring LCC is improved by about 5% to 10%. As a result, the wiring LCC according to the first embodiment can also cancel out the effect of the time constant even if it is narrowed.

The drive signal generator 14Q can output the display drive voltage VcomDC without separately including a low-level voltage generator 62 dedicated to the display drive voltage VcomDC. Thus, the transistor integration percentage in the COG 19 can be reduced, thereby being able to reduce the area of the COG 19.

1-2. Second Embodiment

Figure 24:
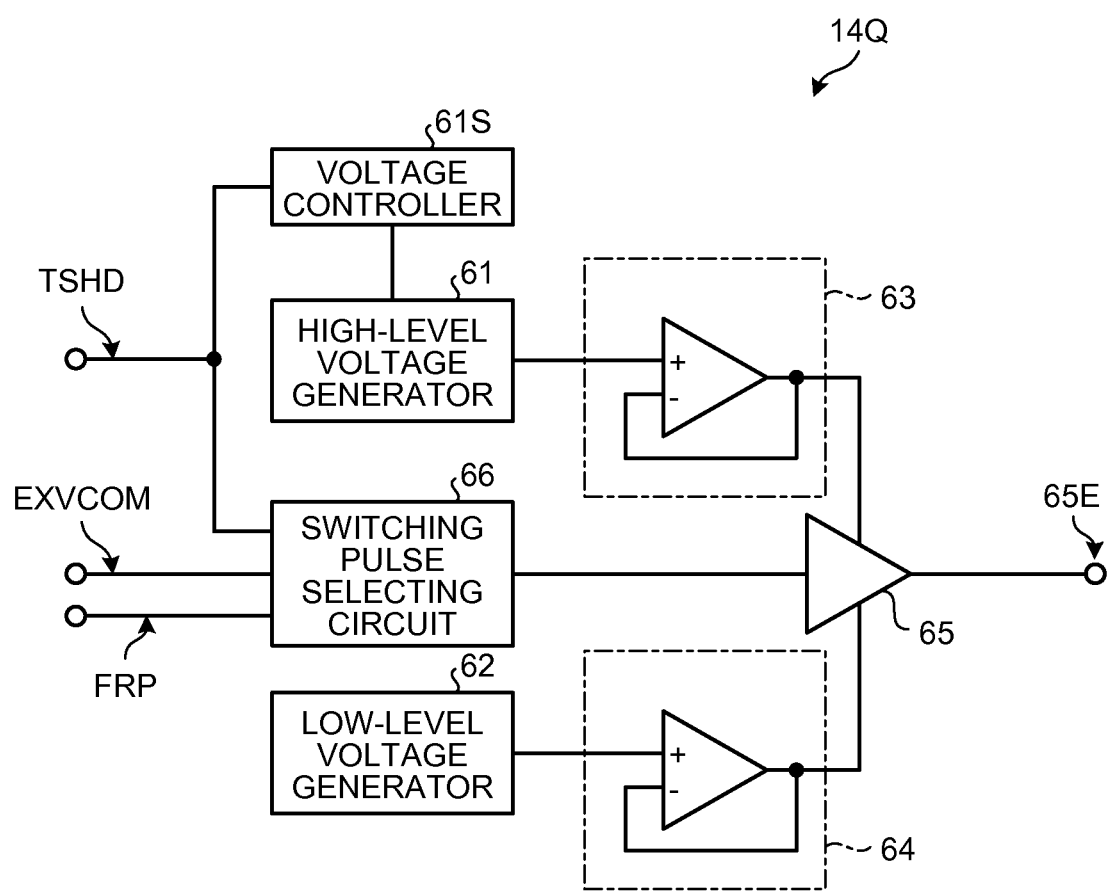
FIG. 24 is a block diagram illustrating a drive signal generator of a drive electrode driver according to a second embodiment.
Figure 25:
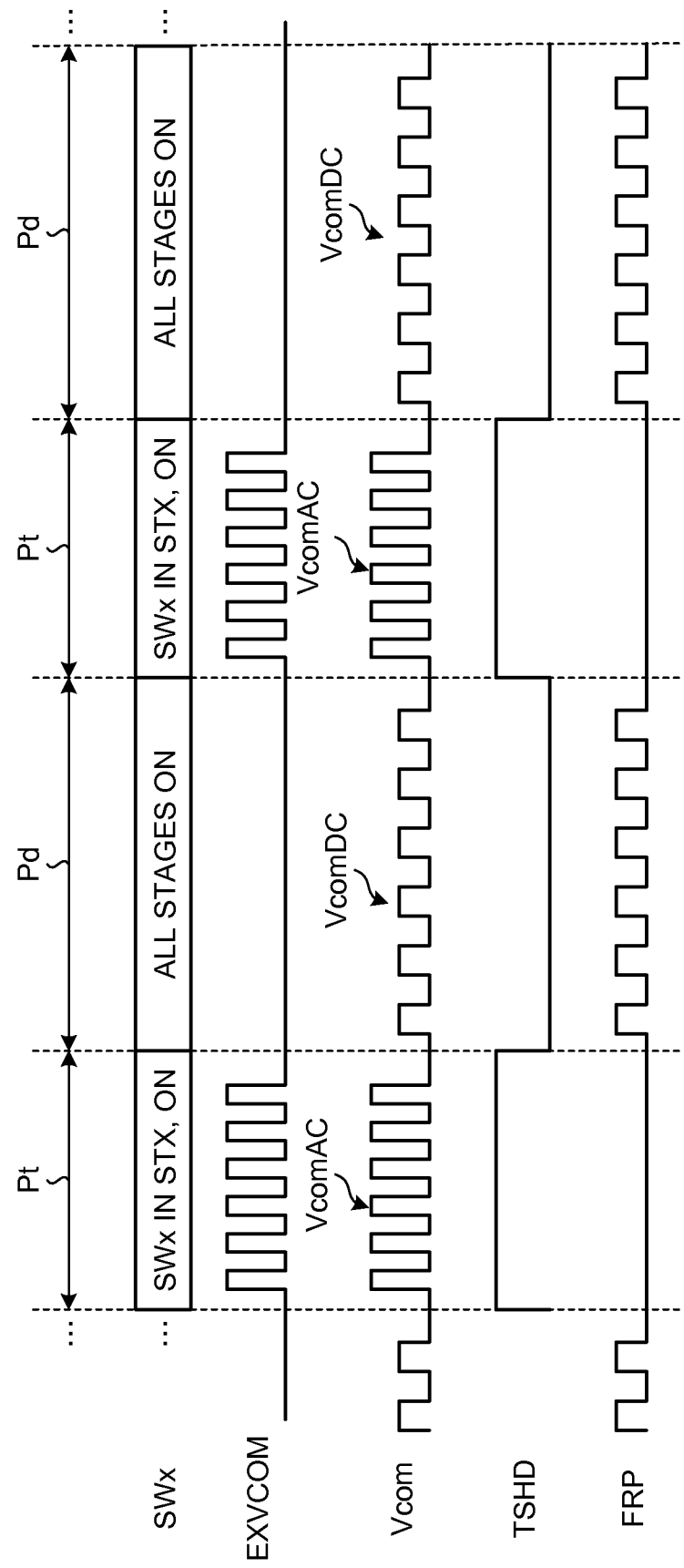
FIG. 25 is an explanatory diagram for illustrating a relationship between waveforms of a drive control signal and an AC drive signal.

Next, a display device with a touch detection function 1 according to the second embodiment will be described. FIG. 24 is a block diagram illustrating a drive signal generator of a drive electrode driver according to the second embodiment. FIG. 25 is an explanatory diagram for illustrating a relationship between waveforms of a drive control signal and an AC drive signal. Components identical to those explained in the above-described first embodiment will be denoted by the same reference numerals and redundant description will not be repeated.

As illustrated in FIG. 24, a drive signal generator 14Q includes a high-level voltage generator 61, a voltage control unit 61S, a low-level voltage generator 62, buffers 63 and 64, a switching circuit 65, and a switching pulse selecting circuit 66. In the drive signal generator 14Q, a drive control signal EXVCOM, an inversion control signal FRP, and a touch detection period identification signal TSHD are inputted to the switching pulse selecting circuit 66 from the control unit 11. The inversion control signal FRP is a signal inverted for every one horizontal period. The touch detection period identification signal TSHD is an identification signal which exhibits a high voltage value in the touch detection operation period Pt during which a touch detection operation is performed and exhibits a low voltage value in the display operation period Pd during which a display operation is performed as illustrated in FIG. 25. The voltage control unit 61S is a control circuit for controlling, when the high voltage value of the touch detection period identification signal TSHD is not inputted, the high-level voltage generator 61 to generate a voltage which is higher than a voltage generated by the low-level voltage generator 62 and which has a voltage value different from a voltage generated when the high voltage value of the touch detection period identification signal TSHD is inputted.

The switching pulse selecting circuit 66 selects the pulse of the drive control signal EXVCOM if the high voltage value of the touch detection period identification signal TSHD exceeding a predetermined threshold value is inputted.

As illustrated in FIG. 25, the switching circuit 65 generates a drive signal VcomAC by alternately repeating a case where the potential is at a high level and a case where the potential is at a low level based on the drive control signal EXVCOM. When the potential of the drive control signal EXVCOM is at a high level, the switching circuit 65 outputs the voltage provided by the buffer 63. When the potential of the drive control signal EXVCOM is at a low level, the switching circuit 65 outputs the voltage supplied from the buffer 64.

The switching pulse selecting circuit 66 selects the pulse of the inversion control signal FRP if the high voltage value of the touch detection period identification signal TSHD exceeding the predetermined threshold value is not inputted.

As illustrated in FIG. 25, the switching circuit 65 generates a drive signal VcomDC, which is inverted like an alternating current, by alternately repeating a case where the potential is at a high level and a case where the potential is at a low level based on the pulse of the inversion control signal FRP. When the potential of the inversion control signal FRP is at a high level, the switching circuit 65 outputs the voltage supplied from the buffer 63. When the potential of the inversion control signal FRP is at a low level, the switching circuit 65 outputs the voltage provided by the buffer 64. Therefore, the display drive voltage VcomDC and the drive signal VcomAC are applied with different voltage values and pulse widths. Thus, the display device with a touch detection function 1 according to the second embodiment can apply the display drive voltage VcomDC at any voltage in accordance with the liquid crystal display unit 20. The display device with a touch detection function 1 according to the second embodiment can also reduce its power consumption by reducing the amplitude of the pixel signal Vpix.

The display devices with a touch detection function 1 according to the first embodiment and the second embodiment have a possibility that the specific resistance (substance-specific resistance value) of liquid crystals, or the like, is deteriorated due to a homopolar direct-current voltage continuously applied to the liquid crystal element LC. In order to prevent deterioration in the specific resistance (substance-specific resistance value) of liquid crystals, or the like, the display device with a touch detection function 1 according to the first embodiment can employ a driving scheme with which the polarity of a video signal is inverted with a predetermined cycle with the potential of the display drive voltage VcomDC used as a reference.

For example, as a driving scheme for the liquid crystal display unit 20, a driving scheme such as line inversion, dot inversion, or frame inversion is known. The line inversion is a driving scheme with which the polarity of a video signal is inverted with a time cycle of 1H (H is a horizontal period) corresponding to one line (one pixel row). The dot inversion is a driving scheme with which the polarity of a video signal is inverted in an alternate manner for each of pixels adjacent to each other in the vertical and horizontal directions. The frame inversion is a driving scheme with which the same polarity of video signals written into all pixels is inverted at once for every one frame corresponding to one screen. The display device with a touch detection function 1 according to the first embodiment can employ one of the line inversion and dot inversion driving schemes.

The display device with a touch detection function 1 according to the second embodiment can invert (change) the potential of the predetermined voltage of the display drive voltage VcomDC at predetermined intervals. Thus, the line inversion driving scheme can be employed.

1-3. Third Embodiment

Figure 26:
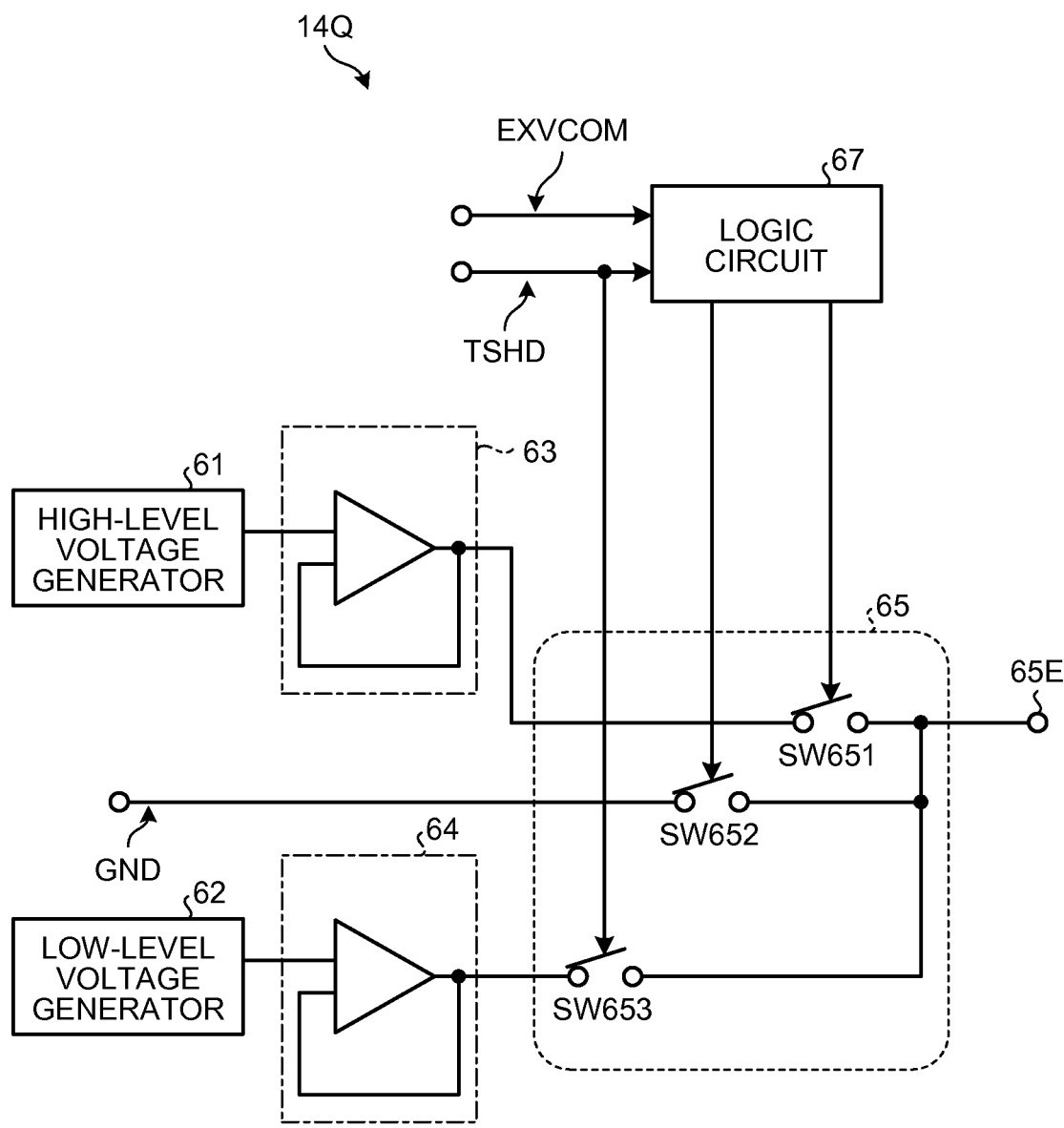
FIG. 26 is a block diagram illustrating a drive signal generator of a drive electrode driver according to a third embodiment.
Figure 27:
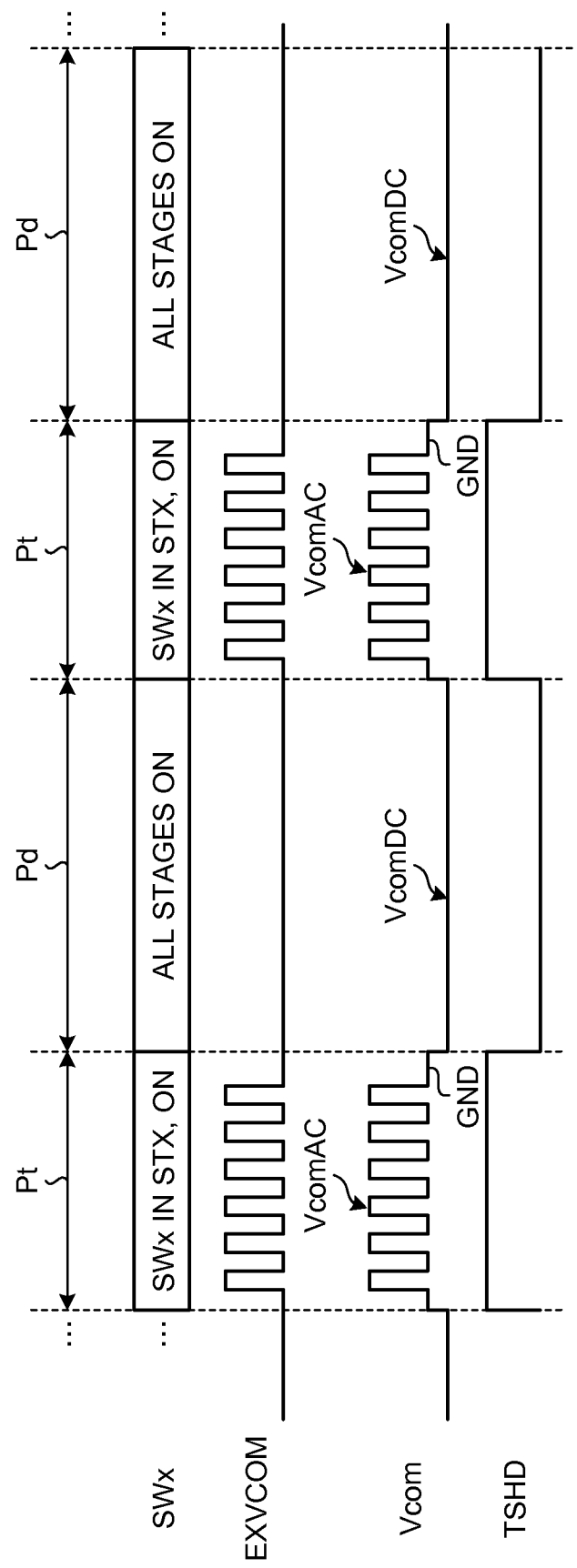
FIG. 27 is an explanatory diagram for illustrating a relationship between waveforms of a drive control signal and an AC drive signal.

Next, a display device with a touch detection function 1 according to the third embodiment will be described. FIG. 26 is a block diagram illustrating a drive signal generator of a drive electrode driver according to the third embodiment. FIG. 27 is an explanatory diagram for illustrating a relationship between waveforms of a drive control signal and an AC drive signal. Components identical to those explained in the above-described first and second embodiments will be denoted by the same reference numerals and redundant description will not be repeated.

As illustrated in FIG. 26, a drive signal generator 14Q includes a high-level voltage generator 61, a low-level voltage generator 62, buffers 63 and 64, a switching circuit 65, and a logic (AND) circuit 67. In the drive signal generator 14Q, a drive control signal EXVCOM and a touch detection period identification signal TSHD are inputted to the logic circuit 67 from the control unit 11. The touch detection period identification signal TSHD is an identification signal which exhibits a high voltage value in the touch detection operation period Pt during which a touch detection operation is performed and exhibits a low voltage value in the display operation period Pd during which a display operation is performed as illustrated in FIG. 27. The switching circuit 65 includes a switch SW651 which performs an ON operation according to an output of the logic circuit 67, a switch SW652 which performs an ON operation according to an output of the logic circuit 67, and a switch SW653 which performs an ON operation according to the touch detection period identification signal TSHD.

The high-level voltage generator 61 generates a high-level voltage of the drive signal VcomAC. The low-level voltage generator 62 generates a direct-current voltage of the display drive voltage VcomDC. The voltage supplied from the high-level voltage generator 61 through the buffer 63 is supplied to the switch SW651 of the switching circuit 65. A constant voltage, e.g., a fixed voltage GND which is a ground voltage, is supplied to the switch SW652 of the switching circuit 65. The voltage supplied from the low-level voltage generator 62 through the buffer 64 is supplied to the switch SW653 of the switching circuit 65. A specific example of a first voltage in the present disclosure is the voltage generated by the high-level voltage generator 61. A specific example of a second voltage in the present disclosure is the voltage generated by the low-level voltage generator 62. A specific example of a third voltage in the present disclosure is the fixed voltage GND.

When the potential of the touch detection period identification signal TSHD is at a high level, the switch SW653 performs an OFF operation, thereby not outputting the output of the buffer 64 to an output terminal 65E. When the potential of the touch detection period identification signal TSHD is at a high level and the potential of the drive control signal EXVCOM is at a high level, the switch SW651 performs an ON operation, thereby outputting the output of the buffer 63 to the output terminal 65E as the high-level potential of the drive signal VcomAC. When the potential of the touch detection period identification signal TSHD is at a high level and the potential of the drive control signal EXVCOM is at a low level, the switch SW651 performs an OFF operation, thereby not outputting the output of the buffer 63 to the output terminal 65E.

When the potential of the touch detection period identification signal TSHD is at a high level and the potential of the drive control signal EXVCOM is at a low level, the switch SW652 performs an ON operation, thereby outputting the fixed voltage GND to the output terminal 65E as the low-level potential of the drive signal VcomAC. When the potential of the touch detection period identification signal TSHD is at a high level and the potential of the drive control signal EXVCOM is at a high level, the switch SW652 performs an OFF operation, thereby not outputting the fixed voltage GND to the output terminal 65E. Thus, in the touch detection operation period Pt, the switching circuit 65 generates the drive signal VcomAC by alternately repeating the high-level potential generated by the high-level voltage generator 61 and the potential of the fixed voltage GND based on the drive control signal EXVCOM.

When the potential of the touch detection period identification signal TSHD is at a low level, the switch SW651 and the switch SW652 each perform an OFF operation regardless of the drive control signal EXVCOM. When the potential of the touch detection period identification signal TSHD is at a low level, the switch SW653 performs an ON operation, thereby outputting the output of the buffer 64 to the output terminal 65E as the display drive voltage VcomDC. In this manner, the display drive voltage VcomDC is supplied to the output terminal 65E in the display period Pd.

In the display device with a touch detection function 1 according to the third embodiment, the lower potential of the drive signal VcomAC supplied to the drive electrode COML is the ground potential. Therefore, the drive signal generator 14Q can make the rectangular wave of the drive signal VcomAC fall without the on-resistance of the buffer 64. As a result, the fall of the drive signal VcomAC is accelerated, thereby making it possible to narrow the pulse width of the rectangular wave of the drive signal VcomAC so as to achieve high-speed driving. The display device with a touch detection function 1 according to the third embodiment can also reduce its power consumption. It is also possible to combine the configuration of the third embodiment and the configuration of the second embodiment.

1-4. Modification

Although the present disclosure has been described above with reference to some embodiments and modification, the present disclosure is not limited to these embodiments or the like and various modifications are possible.

Figure 28:
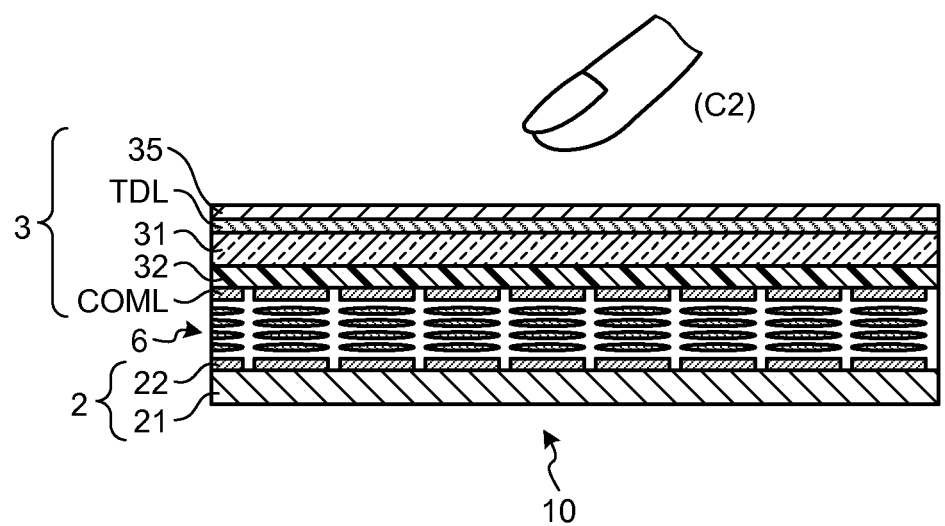
FIG. 28 is a cross-sectional view representing a schematic cross-sectional structure of a display device with a touch detection function according to a modification.

In the display device with a touch detection function 1 according to each of the above-described embodiments and modification, the liquid crystal display unit 20 using liquid crystals in various modes such as FFS and IPS and the touch detection device 30 can be integrated together to obtain the display unit with a touch detection function 10. FIG. 28 is a cross-sectional view representing a schematic cross-sectional structure of the display device with a touch detection function according to a modification. Instead, in the display unit with a touch detection function 10 according to the modification illustrated in FIG. 28, liquid crystals in various modes including a twisted nematic (TN), a vertical alignment (VA), and an electrically controlled birefringence (ECB), and the touch detection device can be integrated together.

As illustrated in FIG. 28, in a case where the drive electrodes COML are disposed in the counter substrate 3, the wiring LCC may be included in the counter substrate 3. This configuration makes the distance between the drive electrodes COML and the wiring LCC smaller. The wiring LCC is arranged in the frame area Gd positioned outside the display area Ad in the direction perpendicular to the TFT substrate 21.

Although the apparatus in which the liquid crystal display unit 20 and the capacitance type touch detection device 30 are integrated together is employed in each of the above-described embodiments, this is not a limitation. Instead, it may be a device on which the liquid crystal display unit 20 and the capacitance type touch detection device 30 are mounted, for example. In the case of such a device on which the liquid crystal display unit 20 and the capacitance type touch detection device 30 are mounted, the drive electrode COML in the pixel substrate 2 illustrated in FIG. 8 is used as a first drive electrode COML and a second drive electrode COML is additionally provided on a surface of the glass substrate 31. The first drive electrode COML and the second drive electrode COML are electrically coupled to each other. Also in this case, by employing the configuration as described above, touch detection can be performed while suppressing effects of external noise and noise transmitted from the liquid crystal display device (that corresponding to the internal noise in each of the above-described embodiments).

2. Application Examples

Next, application examples of the display device with a touch detection function 1 described in each of the embodiments and the modifications will be described with reference to FIGS. 29 to 41. FIGS. 29 to 41 are diagrams each illustrating an example of an electronic apparatus to which any one of the display devices with a touch detection function according to the embodiments of the present disclosure is applied. The display devices with a touch detection function 1 according to the first, second, and third embodiments and the modifications can be applied to electronic apparatuses in any fields such as TV apparatuses, digital cameras, notebook personal computers, portable electronic apparatuses such as mobile phones, or video cameras. In other words, the display devices with a touch detection function 1 according to the first, second, and third embodiments and the modifications can be applied to electronic apparatuses in any fields for displaying externally-inputted video signals or internally-generated video signals as images or videos.

Application Example 1

Figure 29:
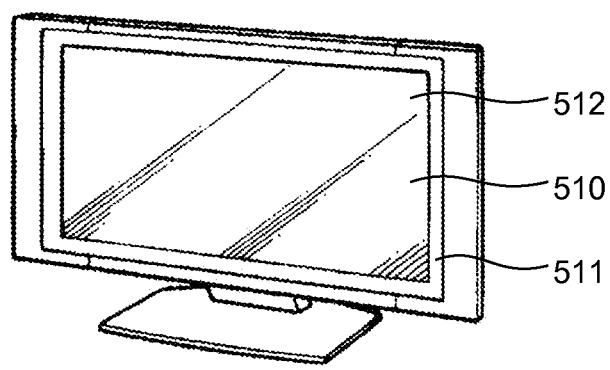
FIG. 29 is a diagram illustrating one example of electronic apparatuses to which the display device with a touch detection function according to any one of the embodiments is applied.

An electronic apparatus illustrated in FIG. 29 is a TV apparatus to which any one of the display devices with a touch detection function 1 according to the first, second, and third embodiments and the modifications is applied. This TV apparatus includes a video display screen unit 510 containing a front panel 511 and a filter glass 512, for example. This video display screen unit 510 is any one of the display devices with a touch detection function according to the first, second, and third embodiments and the modifications.

Application Example 2

Figure 30:
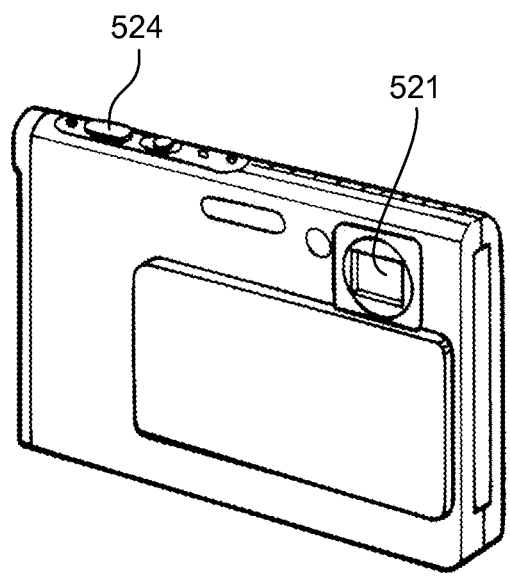
FIG. 30 is a diagram illustrating one example of electronic apparatuses to which the display device with a touch detection function according to any one of the embodiments is applied.
Figure 31:
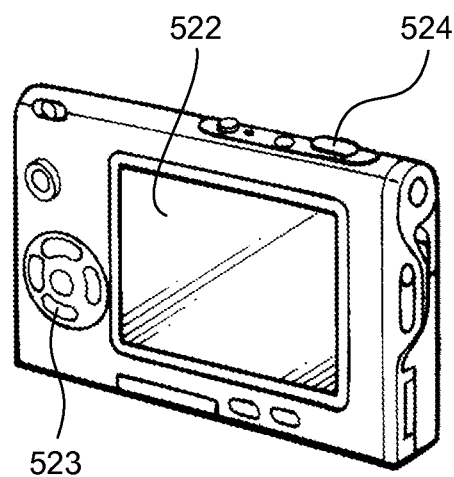
FIG. 31 is a diagram illustrating one example of electronic apparatuses to which the display device with a touch detection function according to any one of the embodiments is applied.

An electronic apparatus illustrated in FIGS. 30 and 31 is a digital camera to which any one of the display devices with a touch detection function 1 according to the first, second, and third embodiments and the modifications is applied. This digital camera includes: a flash light-emitting unit 521; a display unit 522; a menu switch 523; and a shutter release button 524, for example. The display unit 522 is any one of the display devices with a touch detection function according to the first, second, and third embodiments and the modifications.

Application Example 3

Figure 32:
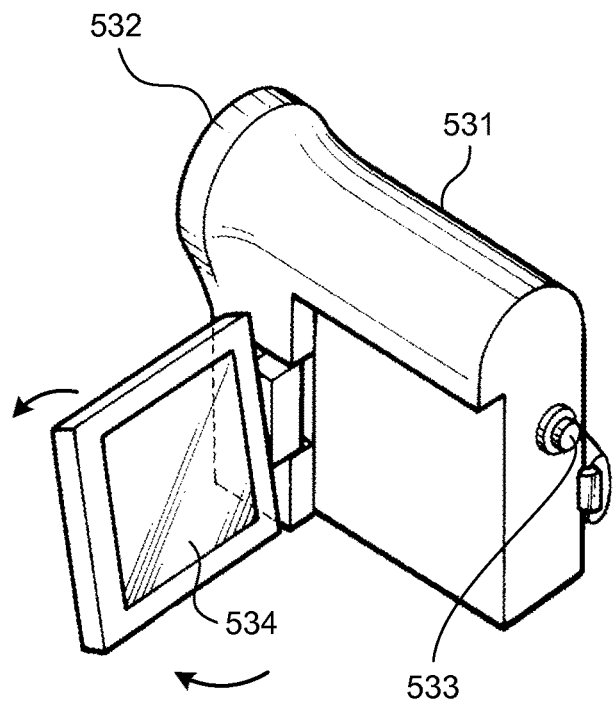
FIG. 32 is a diagram illustrating one example of electronic apparatuses to which the display device with a touch detection function according to any one of the embodiments is applied.

An electronic apparatus illustrated in FIG. 32 illustrates an appearance of a video camera to which any one of the display devices with a touch detection function 1 according to the first, second, and third embodiments and the modifications is applied. This video camera includes: a main body unit 531; a lens 532 for capturing an object, which is provided on a front side surface of the main body unit 531; a start/stop switch 533 for photographing; and a display unit 534, for example. The display unit 534 is any one of the display devices with a touch detection function according to the first, second, and third embodiments and the modifications.

Application Example 4

Figure 33:
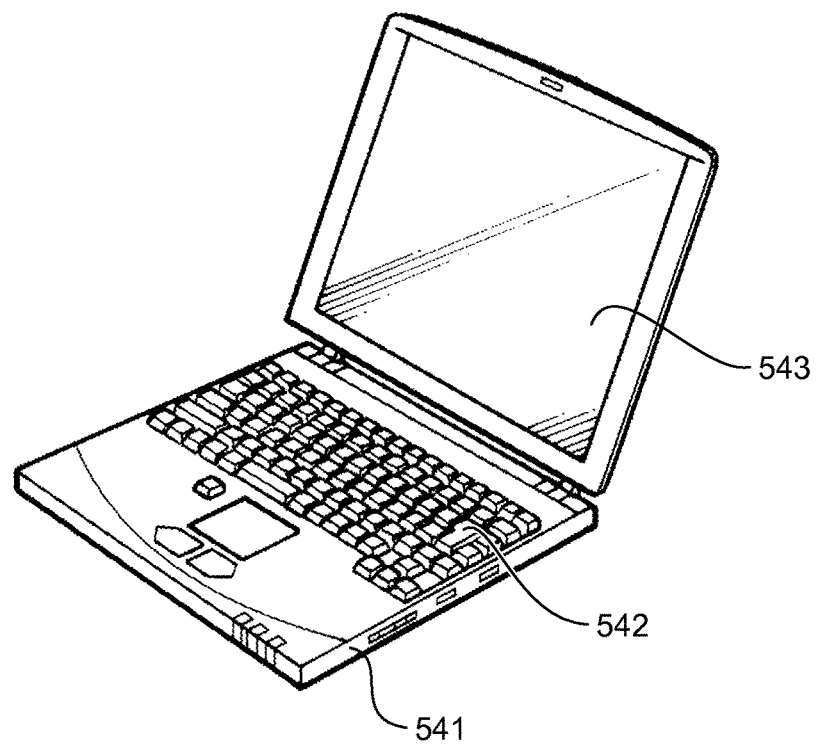
FIG. 33 is a diagram illustrating one example of electronic apparatuses to which the display device with a touch detection function according to any one of the embodiments is applied.
Figure 34:
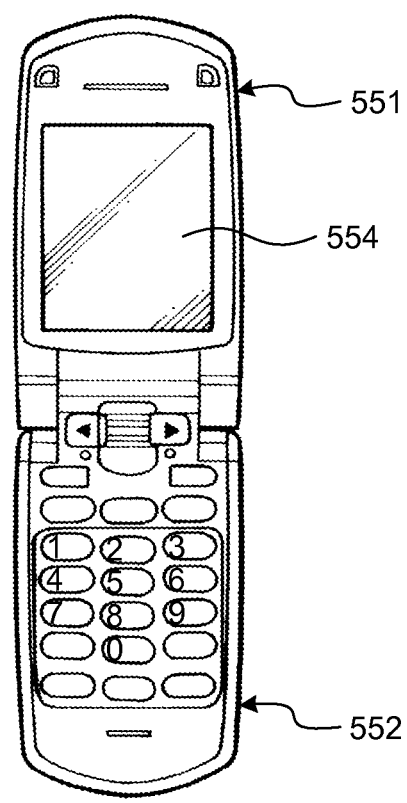
FIG. 34 is a diagram illustrating one example of electronic apparatuses to which the display device with a touch detection function according to any one of the embodiments is applied.
Figure 35:
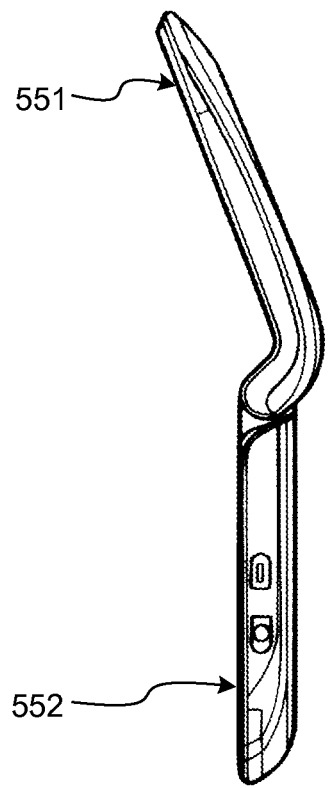
FIG. 35 is a diagram illustrating one example of electronic apparatuses to which the display device with a touch detection function according to any one of the embodiments is applied.
Figure 36:
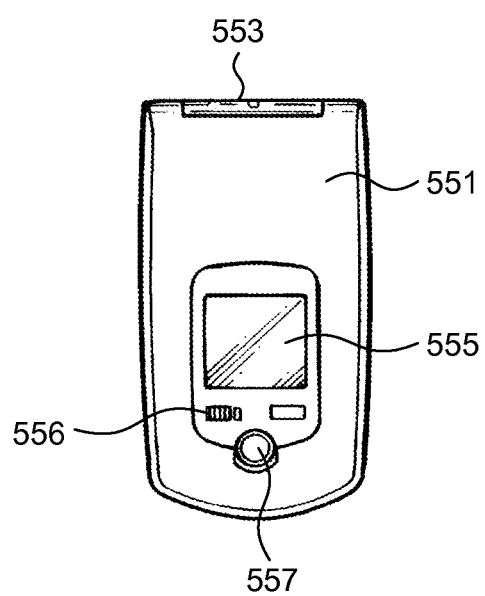
FIG. 36 is a diagram illustrating one example of electronic apparatuses to which the display device with a touch detection function according to any one of the embodiments is applied.
Figure 37:
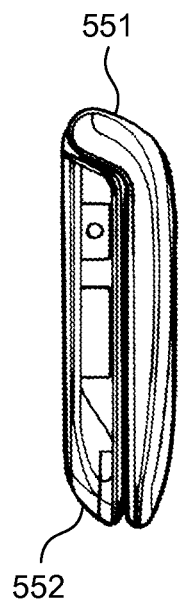
FIG. 37 is a diagram illustrating one example of electronic apparatuses to which the display device with a touch detection function according to any one of the embodiments is applied.
Figure 38:
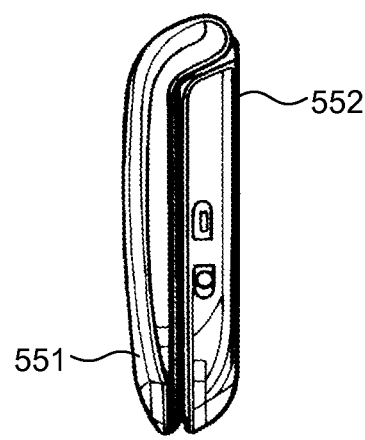
FIG. 38 is a diagram illustrating one example of electronic apparatuses to which the display device with a touch detection function according to any one of the embodiments is applied.
Figure 39:
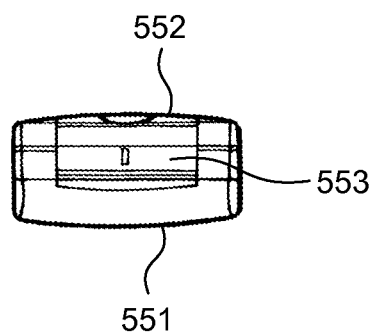
FIG. 39 is a diagram illustrating one example of electronic apparatuses to which the display device with a touch detection function according to any one of the embodiments is applied.
Figure 40:
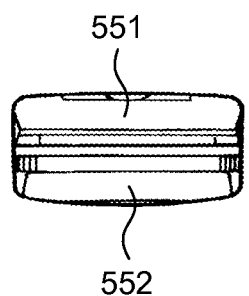
FIG. 40 is a diagram illustrating one example of electronic apparatuses to which the display device with a touch detection function according to any one of the embodiments is applied.

An electronic apparatus illustrated in FIG. 33 is a notebook personal computer to which any one of the display devices with a touch detection function 1 according to the first, second, and third embodiments and the modifications is applied. This notebook personal computer includes: a main body 541; a keyboard 542 provided for an operation of inputting characters and the like; and a display unit 543 for displaying an image, for example. The display unit 543 is any one of the display devices with a touch detection function according to the first, second, and third embodiments and the modifications.

Application Example 5

An electronic apparatus illustrated in FIGS. 34 to 40 is a mobile phone to which any one of the display devices with a touch detection function 1 according to the first, second, and third embodiments and the modifications is applied. For example, this mobile phone is configured by coupling an upper housing 551 with a lower housing 552 by means of a coupling unit (hinge unit) 553, and includes: a display 554; a sub-display 555; a picture light 556; and a camera 557. The display 554 or the sub-display 555 is any one of the display devices with a touch detection function according to the first, second, and third embodiments and the modifications.

Application Example 6

Figure 41:
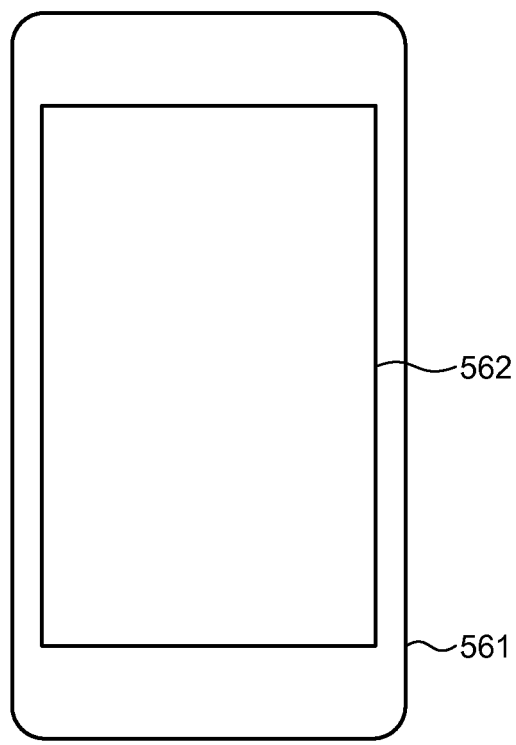
FIG. 41 is a diagram illustrating one example of electronic apparatuses to which the display device with a touch detection function according to any one of the embodiments is applied.

An electronic apparatus illustrated in FIG. 41 operates as a portable computer, a multifunctional mobile phone, a portable computer capable of making a voice phone call, or a portable computer capable of communications. This is a personal digital assistant sometimes referred to as a so-called smartphone or tablet terminal. This personal digital assistant includes a display unit 562 on a surface of a housing 561, for example. This display unit 562 is any one of the display devices with a touch detection function 1 according to the first, second, and third embodiments and the modifications.

3. Aspects of Present Disclosure

The present disclosure includes the following aspects.

(1) A display device with a touch detection function, comprising:
a display area where a plurality of pixel electrodes are arranged in a matrix shape above a substrate;
multi-divided drive electrodes provided so as to face the pixel electrodes;

a display functional layer having an image display function of displaying an image on the display area;

a control device for performing image display control by applying a display drive voltage between the pixel electrodes and the drive electrodes based on an image signal to exert the image display function of the display functional layer;

a touch detection electrode facing the drive electrodes and forming a capacitance between the touch detection electrode and the drive electrodes;

a touch detection unit for detecting a position of a proximity object based on a detection signal from the touch detection electrode;

a wiring arranged in a frame area positioned outside the display area; and a plurality of selection switches for selecting the drive electrodes to be coupled to the wiring based on a selection signal of the control device, wherein the control device supplies the display drive voltage and a touch drive signal to the same wiring at different times.

(2) The display device with a touch detection function according to (1), wherein when the touch drive signal is provided to the wiring, the control device makes a selection switch corresponding to the selection signal among the plurality of selection switches perform a closing operation so as to apply the touch drive signal to a selected one of the drive electrodes.

(3) The display device with a touch detection function according to (2), wherein the control device makes the plurality of selection switches excluding the selection switch corresponding to the selection signal perform an opening operation so as not to fix a potential of an unselected one of the drive electrodes.

(4) The display device with a touch detection function according to (1), wherein when the display drive voltage is provided to the wiring, the control device makes all of the plurality of selection switches perform a closing operation so as to apply the display drive voltage to the plurality of drive electrodes.

(5) The display device with a touch detection function according to (1), wherein the control device further includes a drive signal generator for generating the display drive voltage and the touch drive signal;

the drive signal generator includes a first voltage generator for generating a first voltage, a second voltage generator for generating a second voltage lower than the first voltage, and a switching circuit for generating the touch drive signal by switching between the first voltage and the second voltage according to a pulse of a drive control signal; and when the pulse of the drive control signal does not exist, the switching circuit outputs one of the first voltage and the second voltage as the display drive voltage, and when the pulse of the drive control signal exists, the switching circuit outputs a rectangular wave switched between the first voltage and the second voltage as the touch drive signal.

(6) The display device with a touch detection function according to (5), wherein the drive signal generator identifies a period during which the touch drive signal is supplied to the wiring and a period during which the display drive voltage is supplied to the wiring, and changes the first voltage accordingly.

(7) The display device with a touch detection function according to (1), wherein the control device further includes a drive signal generator for generating the display drive voltage and the touch drive signal;

the drive signal generator includes a first voltage generator for generating a first voltage, a second voltage generator for generating a second voltage lower than the first voltage, a switching pulse selecting circuit for selecting between a pulse of an inversion control signal inverted for every one horizontal period and a pulse of a drive control signal, and a switching circuit for switching between the first voltage and the second voltage; and when the pulse of the inversion control signal is selected, the switching circuit outputs a rectangular wave switched between the first voltage and the second voltage according to the pulse of the inversion control signal as the display drive voltage, and when the pulse of the drive control signal exists, the switching circuit outputs a rectangular wave switched between the first voltage and the second voltage according to the pulse of the drive control signal as the touch drive signal.

(8) The display device with a touch detection function according to (1), wherein:

the control device further includes a drive signal generator for generating the display drive voltage and the touch drive signal;

the drive signal generator includes:

a first voltage generator for generating a first voltage, a second voltage generator for generating a second voltage lower than the first voltage, and a switching circuit for outputting the touch drive signal or the display drive voltage based on the first voltage, the second voltage, and a third voltage which is a constant voltage according to an identification signal for identifying a touch detection operation period during which a touch detection operation is performed and a display operation period during which a display operation is performed; and in the case of the display operation period, the switching circuit outputs the second voltage as the display drive voltage, and in the case of the touch detection operation period, the switching circuit outputs a rectangular wave switched between the first voltage and the third voltage as the touch drive signal.

(9) An electronic apparatus comprising a display device with a touch detection function capable of detecting an external proximity object, wherein the display device with a touch detection function comprises:

a display area where a plurality of pixel electrodes are arranged in a matrix shape above a substrate;

multi-divided drive electrodes provided so as to face the pixel electrodes;

a display functional layer having an image display function of displaying an image on the display area;

a control device for performing image display control by applying a display drive voltage between the pixel electrodes and the drive electrodes based on an image signal to exert the image display function of the display functional layer;

a touch detection electrode facing the drive electrodes and forming a capacitance between the touch detection electrode and the drive electrodes;

a touch detection unit for detecting a position of a proximity object based on a detection signal from the touch detection electrode;

a wiring arranged in a frame area positioned outside the display area; and a plurality of selection switches for selecting the drive electrodes to be coupled to the wiring based on a selection signal of the control device, and the control device supplies the display drive voltage and a touch drive signal to the same wiring at different times.

The electronic apparatus of the present disclosure includes the above-described display device with a touch detection function. Examples of the electronic apparatus include, but are not limited to, television devices, digital cameras, personal computers, video cameras, portable electronic apparatuses such as a mobile phone, etc.

The display device with a touch detection function and the electronic apparatus of the present disclosure can narrow the frame while suppressing an effect of touch detection on display.

According to one embodiment of the display device with a touch detection function and the electronic apparatus of the present disclosure, a thinner profile, a larger screen, or a higher definition can be realized.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device with a touch detection function, comprising: a display area where a plurality of pixel electrodes are arranged in a matrix having a first direction and a second direction crossing the first direction above a substrate; drive electrodes each extending in the second direction, the drive electrodes being arranged in the first direction and provided so as to face the pixel electrodes; a display functional layer having an image display function of displaying an image on the display area; a plurality of pixel signal lines each coupled to the pixel electrodes, the pixel signal lines each extending in the first direction; a source selector that are coupled to the pixels through the pixel signal lines and that performs a switching operation, the source selector including a plurality of source switches; a control device for performing image display control by applying a display drive voltage between the pixel electrodes and the drive electrodes based on an image signal to exert the image display function of the display functional layer, the control device including a drive signal generator for generating the display drive voltage and a touch drive signal, and a source driver that is a circuit for supplying a pixel signal to each of the pixel electrodes, the source driver being coupled to the pixel signal lines through the source switches of the source selector; a touch detection electrode facing the drive electrodes and forming a capacitance between the touch detection electrode and the drive electrodes; a touch detection unit for detecting a position of a proximity object based on a detection signal from the touch detection electrode; a first wire that extends in the first direction and arranged in a frame area positioned outside the display area, the first wire being coupled with an output of the drive signal generator; and a plurality of selection switches for selecting the drive electrodes to be coupled to the first wire based on a selection signal of the control device, the selection signal being a signal for identifying a period during which the drive signal is supplied to the drive electrodes from the drive signal generator through the first wire, wherein the drive signal generator includes a first voltage generator for generating a first voltage, a second voltage generator for generating a second voltage lower than the first voltage, and a switching circuit for switching between the first voltage and the second voltage to output to the first wire, wherein the drive signal generator supplies, in a touch detection operation period, the display drive voltage that is an alternative voltage of the first voltage and the second voltage to the first wire that is same wire to which the drive signal generator supplies, in a display operation period, the touch drive signal that is the second voltage, wherein the selection switches are arranged in the frame area along the first wire and overlapped by the first wire to allow the display drive voltage and the touch drive signal to be supplied through the same wire, wherein each of the selection switches includes a first gate electrode and a second gate electrode, and wherein the selection switches select the drive electrodes to be coupled to the first wire by opening or closing a coupling between a first coupling conductor and a second coupling conductor according to the selection signal from the control device to the first gate electrode and the second gate electrode.

2. The display device with a touch detection function according to claim 1, wherein when the touch drive signal is provided to the first wire, the control device makes a selection switch corresponding to the selection signal among the plurality of selection switches perform a closing operation so as to apply the touch drive signal to a selected one of the drive electrodes.

3. The display device with a touch detection function according to claim 2, wherein the control device makes the plurality of selection switches excluding the selection switch corresponding to the selection signal perform an opening operation so as not to fix a potential of an unselected one of the drive electrodes.

4. The display device with a touch detection function according to claim 1, wherein when the display drive voltage is provided to the first wire, the control device makes all of the plurality of selection switches perform a closing operation so as to apply the display drive voltage to the plurality of drive electrodes.

5. The display device with a touch detection function according to claim 1, wherein the switching circuit for generating the touch drive signal switches between the first voltage and the second voltage according to a pulse of a drive control signal, the first wire is supplied from the switching circuit with:

when the pulse of the drive control signal does not exist, the second voltage as the display drive voltage; and when the pulse of the drive control signal exists, a rectangular wave switched between the first voltage and the second voltage as the touch drive signal.

6. The display device with a touch detection function according to claim 5, wherein the drive signal generator identifies the touch detection operation period during which the touch drive signal is supplied to the first wire, and the display operation period during which the display drive voltage is supplied to the first wire, and changes the first voltage accordingly.

7. A display device with a touch detection function, comprising: a display area where a plurality of pixel electrodes are arranged in a matrix having a first direction and a second direction crossing the first direction above a substrate; drive electrodes each extending in the second direction, the drive electrodes being arranged in the first direction and provided so as to face the pixel electrodes; a display functional layer having an image display function of displaying an image on the display area; a plurality of pixel signal lines each coupled to the pixel electrodes, the pixel signal lines each extending in the first direction; a source selector that are coupled to the pixels through the pixel signal lines and that performs a switching operation, the source selector including a plurality of source switches; a control device for performing image display control by applying a display drive voltage between the pixel electrodes and the drive electrodes based on an image signal to exert the image display function of the display functional layer, the control device including a drive signal generator for generating the display drive voltage and a touch drive signal, and a source driver that is a circuit for supplying a pixel signal to each of the pixel electrodes, the source driver being coupled to the pixel signal lines through the source switches of the source selector; a touch detection electrode facing the drive electrodes and forming a capacitance between the touch detection electrode and the drive electrodes; a touch detection unit for detecting a position of a proximity object based on a detection signal from the touch detection electrode; a first wire that extends in the first direction and arranged in a frame area positioned outside the display area, the first wire being coupled with an output of the drive signal generator; and a plurality of selection switches for selecting the drive electrodes to be coupled to the first wire based on a selection signal of the control device, the selection signal being a signal for identifying a period during which the drive signal is supplied to the drive electrodes from the drive signal generator through the first wire, wherein: the drive signal generator includes a first voltage generator for generating a first voltage, a second voltage generator for generating a second voltage lower than the first voltage, and a switching circuit for outputting the touch drive signal or the display drive voltage to the first wire based on the first voltage, the second voltage, and a third voltage which is a constant voltage according to an identification signal for identifying a touch detection operation period during which a touch detection operation is performed and a display operation period during which a display operation is performed; wherein the drive signal generator supplies, in the display operation period, the second voltage as the display drive voltage to the first wire that is a same wire to which the drive signal generator supplies, in the touch detection operation period, a rectangular wave switched between the first voltage and the third voltage as the touch drive signal, wherein the selection switches are arranged in the frame area along the first wire and overlapped by the first wire to allow the display drive voltage and the touch drive signal to be supplied through the same wire, wherein each of the selection switches includes a first gate electrode and a second gate electrode, and wherein the selection switches select the drive electrodes to be coupled to the first wire by opening or closing a coupling between a first coupling conductor and a second coupling conductor according to the selection signal from the control device to the first gate electrode and the second gate electrode.

8. An electronic apparatus comprising a display device with a touch detection function capable of detecting an external proximity object, wherein the display device with a touch detection function comprises: a display area where a plurality of pixel electrodes are arranged in a matrix having a first direction and a second direction crossing the first direction above a substrate; drive electrodes each extending in the second direction, the drive electrodes being arranged in the first direction and provided so as to face the pixel electrodes; a display functional layer having an image display function of displaying an image on the display area; a plurality of pixel signal lines each coupled to the pixel electrodes, the pixel signal lines each extending in the first direction; a source selector that are coupled to the pixels through the pixel signal lines and that performs a switching operation, the source selector including a plurality of source switches; a control device for performing image display control by applying a display drive voltage between the pixel electrodes and the drive electrodes based on an image signal to exert the image display function of the display functional layer, the control device including a drive signal generator for generating the display drive voltage and a touch drive signal, and a source driver that is a circuit for supplying a pixel signal to each of the pixel electrodes, the source driver being coupled to the pixel signal lines through the source switches of the source selector; a touch detection electrode facing the drive electrodes and forming a capacitance between the touch detection electrode and the drive electrodes; a touch detection unit for detecting a position of a proximity object based on a detection signal from the touch detection electrode; a first wire that extends in the first direction and arranged in a frame area positioned outside the display area, the first wire being coupled with an output of the drive signal generator; and a plurality of selection switches for selecting the drive electrodes to be coupled to the first wire based on a selection signal of the control device, the selection signal being a signal for identifying a period during which the drive signal is supplied to the drive electrodes from the drive signal generator through the first wire, wherein the drive signal generator includes a first voltage generator for generating a first voltage, a second voltage generator for generating a second voltage lower than the first voltage, and a switching circuit for switching between the single first voltage and the second voltage to output to the first wire, wherein the drive signal generator supplies, in a touch detection operation period, the display drive voltage that is an alternative voltage of the first voltage and the second voltage to the first wire that is a same wire to which the drive signal generator supplies, in a display operation period, the touch drive signal that is the second voltage, wherein the selection switches are arranged in the frame area along the first wire and overlapped by the first wire to allow the display drive voltage and the touch drive signal to be supplied through the same wire, wherein each of the selection switches includes a first gate electrode and a second gate electrode, and wherein the selection switches select the drive electrodes to be coupled to the first wire by opening or closing a coupling between a first coupling conductor and a second coupling conductor according to the selection signal from the control device to the first gate electrode and the second gate electrode.

9. The display device with a touch detection function according to claim 1, further comprising a plurality of drive parts disposed in the first direction in the frame area, the drive parts each including: one of the selection switches; the first coupling conductor that extends in the first direction; and the second coupling conductor that extends in the first direction, wherein each of the selection switches is coupled to the first wire through the first coupling conductor and coupled to the drive electrodes through the second coupling conductor.

10. The display device with a touch detection function according to claim 1, wherein the second coupling conductor is provided between the first gate electrode and the second electrode that extend in the first direction, and a couple of the first coupling conductors are provided along outsides of the first gate electrode and the second gate electrode.

11. The display device with a touch detection function according to claim 1, wherein the first and second gate electrodes are aligned along the first wire, and each of the first and second gate electrodes is disposed between the first coupling conductor and the second coupling conductor.

12. The display device with a touch detection function according to claim 1, wherein the first wire extends in the first direction along an area adjacent to ends of the drive electrodes in the second direction.

13. The display device with a touch detection function according to claim 12, wherein a width of the first wire in the second direction is 100 µm or more.

14. The display device with a touch detection function according to claim 1, wherein the drive electrode has a first width in the first direction, and the first wire has a length more than the first width.

15. The display device with a touch detection function according to claim 10, wherein the first wire overlaps all of: the second coupling conductor; the first gate electrode; the second gate electrode; and the couple of the first coupling conductors.

16. The display device with a touch detection function according to claim 11, wherein
    each of the first and second gate electrodes is disposed between:
      the first coupling conductor overlapped by the first wire; and
      the second coupling conductor overlapped by the common electrode.

\* \* \* \* \*